(12) United States Patent
Favalora et al.

(10) Patent No.: US 7,023,466 B2
(45) Date of Patent: Apr. 4, 2006

(54) THREE-DIMENSIONAL DISPLAY SYSTEMS

(75) Inventors: Gregg E. Favalora, Arlington, MA (US); Joshua Napoli, Brighton, MA (US); Michael Halle, Cambridge, MA (US)

(73) Assignee: Actuality Systems, Inc., Bedford, MA (US)

( * ) Notice: Subject to any disclaimer, the term of this patent is extended or adjusted under 35 U.S.C. 154(b) by 591 days.

(21) Appl. No.: 10/053,492

(22) Filed: Nov. 2, 2001

(65) Prior Publication Data

US 2002/0135673 A1  Sep. 26, 2002

Related U.S. Application Data

(60) Provisional application No. 60/245,786, filed on Nov. 3, 2000.

(51) Int. Cl.
*H04N 13/00* (2006.01)

(52) U.S. Cl. .......................... 348/42; 348/51; 359/471

(58) Field of Classification Search ................ 348/42, 348/51; 359/453, 456, 460, 471, 615; 353/7
See application file for complete search history.

(56) References Cited

U.S. PATENT DOCUMENTS

| | | | |
|---|---|---|---|
| 5,132,839 A | 7/1992 | Travis | 359/462 |
| 5,172,251 A | 12/1992 | Benton et al. | 359/9 |
| 5,694,235 A | 12/1997 | Kajiki | |
| 5,745,197 A | 4/1998 | Leung et al. | |
| 5,801,761 A | 9/1998 | Tibor | 348/51 |
| 5,815,314 A | 9/1998 | Sudo | 359/472 |
| 5,854,613 A | 12/1998 | Soltan et al. | |
| 5,907,312 A | 5/1999 | Sato et al. | 345/31 |
| 5,926,294 A | 7/1999 | Sato et al. | 359/22 |
| 5,971,547 A * | 10/1999 | Reilley | 353/122 |
| 6,052,100 A | 4/2000 | Soltan et al. | |
| 6,109,750 A * | 8/2000 | Mayer et al. | 353/7 |
| 6,154,259 A * | 11/2000 | Hargis et al. | 348/756 |
| 6,201,565 B1 | 3/2001 | Balogh | 348/40 |
| 6,433,930 B1 * | 8/2002 | Son | 359/464 |
| 6,437,919 B1 * | 8/2002 | Brown et al. | 359/621 |

FOREIGN PATENT DOCUMENTS

| | | |
|---|---|---|
| WO | 0075698 A1 | 12/2000 |
| WO | 0178409 A2 | 10/2001 |

(Continued)

OTHER PUBLICATIONS

Neil et al., "Spatial Light Modulator Based Three-Dimensional Multiplanar Display" *SPIE* 3012:337-341 (1997).

(Continued)

*Primary Examiner*—Gims Philippe
*Assistant Examiner*—Erick Rekstad
(74) *Attorney, Agent, or Firm*—Fish & Richardson P.C.

(57) ABSTRACT

Three-dimensional display apparatus and methods are disclosed. The apparatus and methods generate three-dimensional images for an observer by providing components of the image in a series of frames to an image space. Providing the image components can include: scanning an image of a light shaping element over an image space wherein each of a plurality of zones of the light shaping element is projected to each of a plurality of zones of the image space; and, selectively illuminating portions of the light shaping element zones during each of several frames during the scan, wherein each light-shaping element zone scatters the illumination and at least a portion of the scattered illumination provides a component of the three-dimensional image in the image space.

25 Claims, 19 Drawing Sheets

FOREIGN PATENT DOCUMENTS

| WO | 01078409 A3 | 10/2001 |
|---|---|---|
| WO | 0188598 A2 | 11/2001 |
| WO | 01088598 A3 | 11/2001 |
| WO | 0239194 A1 | 5/2002 |

OTHER PUBLICATIONS

Miyazaki et al., "Volume Scanning three-dimensional display that uses an inclined image plane" *Applied Optics* vol. 40, No. 20, pp. 3354-3358, Jul. 2001.

Jones et al., "Real-Time Three-Dimensional Display Based On The Partial Pixel Architecture" *Optics Letters* vol. 20, No. 12, pp. 1418-1420, Jun. 1995.

Kullick et al., "Partial Pixels: a three-dimensional diffractive display architecture" *J. Optic. Soc. Am. A* vol. 12, No. 1, pp. 73-83 Jan. 1995.

Nordin et al., "Demonstration of a Novel Three-Dimensional autostereoscopic display" *Optics Letters* 19: 12 pp. 901-903, Jun. 1994.

Sunny Bains, "Alabama researchers create real-time 3D Display" http://www.spie.org/web/oer/january/jan97/Itconstr.html.

Perlin et al., "Recent Advances in the NYU Autostereoscopic Display" *Proceedings of the SPIE*, 4297: 22-24, San Jose Calif (2001).

Perlin et al., "An Autostereoscopic Display" Computer Graphics, vol. 33, No. 3.

Kishigami et al., "Real-time color three-dimensional display system using holographic optical elements" *SPIE* 4296:102-107 (2001).

Slinger et al., "Progress and prospects for practical electro-holographic display systems" *SPIE* 4296:18-32 (2001).

LeRoy D. Dickson et al., "Holography in the EBM 3687 Supermarket Scanner," IBM J. Res. Develop., 26(2):228-234, Mar. 1982.

Ritsuko Kishigami et al., "Real-time color three-dimensional display . . . ," Practical Holography XV and Holographic Materials VII, Stephone A. Benton, Sylvia H. Stevenson, T. John Trout, eds., Proceedings of SPI 4296: 102-107, 2001.

\* cited by examiner

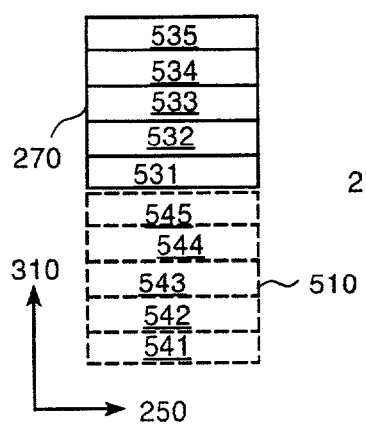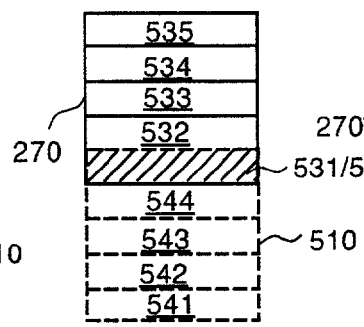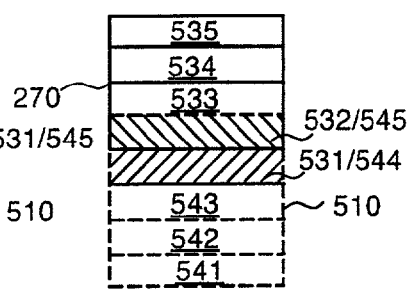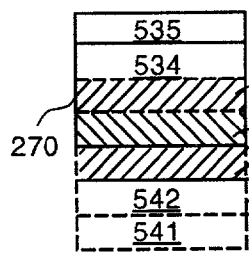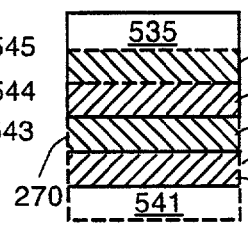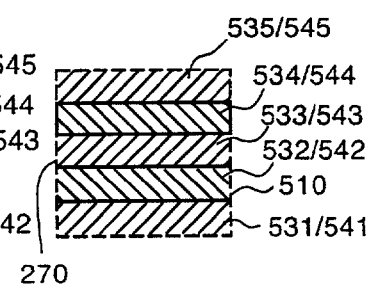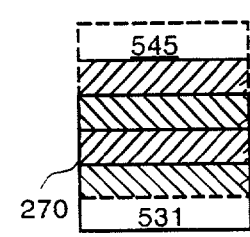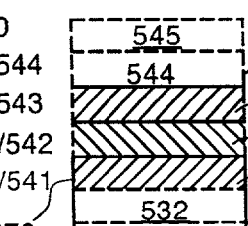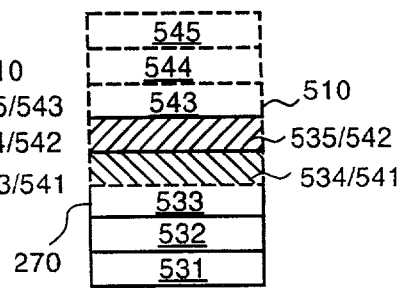

THREE-DIMENSIONAL DISPLAY SYSTEMS

CROSS REFERENCE TO RELATED APPLICATIONS

This application claims priority from U.S. Provisional Application Ser. No. 60/245,786, filed on Nov. 3, 2000, which is incorporated herein by reference in its entirety.

TECHNICAL FIELD

This invention relates to electronic displays, and more particularly to three-dimensional electronic displays.

BACKGROUND

Images, even when rendered in high quality, appear flat when displayed on a flat monitor. Numerous approaches toward displaying images that appear three-dimensional have been proposed. These approaches fall into two main categories: volumetric and stereoscopic.

Volumetric displays produce three-dimensional imagery by generating a collection of points within a volume that emit, or appear to emit, light. If these points emit light isotropically, the image appears 'ghosted' or 'transparent.' A typical volumetric display does not create a true three-dimensional light field because the volume elements are not perceived to block each other, and the images therefore do not display occlusion. Volumetric displays have been disclosed by a number of researchers, including Hirsch (U.S. Pat. No. 2,967,905), Ketchpel (U.S. Pat. No. 3,140,415), and Lewis et al. (*IEEE Trans. Elec. Dev.*, 18, No. 9, pp. 724–732, 1971).

The most common form of stereoscopic displays use shuttered or passively polarized eyewear, in which the observer wears eyewear that blocks one of two displayed images from each eye. Examples include passively polarized glasses, and rapidly alternating shuttered glasses (see, for example, U.S. Pat. No. 4,523,226, awarded to Lipton et al.). While this approach has resulted in some success, having being adopted for use by professionals in the fields of molecular modeling and CAD, these methods have not met with widespread acceptance as observers generally do not like to wear equipment over their eyes. This consideration has motivated developments in the field of autostereoscopic displays.

Autostereoscopic displays perform stereo separation of images internally, and do not require an observer to use additional eyewear. A number of researchers have developed displays that present a different image to each eye, so long as the observer remains in a fixed position in space. Most of these are variations on the parallax barrier method, in which a fine vertical grating or lenticular lens array is placed in front of a display screen. When the observer's eyes remain fixed at a particular location in space, each eye can only see one set of display pixels (even or odd) through the grating or lens array. Each set of pixels displays a view of the image, which the human visual system interprets as a three-dimensional image.

Holographic and pseudo-holographic displays output a partial light field, presenting many different views simultaneously. Also, the imagery can be photorealistic, exhibiting occlusion and other viewpoint-dependent effects (e.g., reflection). This approach has the potential to allow many observers to see the same image simultaneously, but of course requires far greater computational ability and bandwidth than is generally required for a two-view stereo display for a single observer. In many cases, these displays generate a two-dimensional light field, providing horizontal, not vertical, parallax.

In U.S. Pat. No. 5,172,251, Benton discloses a display that creates a light field by holographic light wave interference. More recently, Eichenlaub et al. (*Proc. SPIE*, 3639, p. 110–121, 1999) disclosed a discrete light field display, which produces up to 24 discrete viewing zones, each with a different or pre-stored image. As each of the observer's eyes transitions from one zone to another, the image appears to jump to the next zone. An observer perceives a sense of depth due to stereo disparity when the observer's two eyes are in two different zones.

SUMMARY

The invention features three-dimensional display apparatus and methods. Displays of the invention generate three-dimensional imagery by endowing selected points in an image space (e.g., an image plane or image volume) with the perceived ability to emit light, either isotropically or with trajectory-dependent amplitude.

In general, in one aspect, the invention features a method for forming a three dimensional image by providing components of the image in a series of frames to an image space. The method includes the following steps: (i) scanning an image of a light shaping element over an image space wherein each of a plurality of zones of the light shaping element is projected to each of a plurality of zones of the image space; and (ii) selectively illuminating portions of the light shaping element zones during each of a plurality of frames during the scan, wherein each zone of the light-shaping element scatters the illumination and at least a portion of the scattered illumination provides a component of the three-dimensional image in the image space.

Embodiments of the three-dimensional image-forming method can include any of the following features. During the scanning, every zone of the light-shaping element can be projected to every zone of the image space. Scanning the image of the light-shaping element further can include reflecting the scattered illumination off a scanning optic towards the image space. The light-shaping element image scanning can be in a first direction over the image space (e.g., a vertical direction). The light-shaping element scanning over the image space can also be in a second direction, perpendicular to the first direction (e.g., a horizontal direction).

Each zone of the light-shaping element can scatters light into a predetermined trajectory, such as a trajectory horizontal to a horizontal plane. Each zone of the light-shaping element can also diffusely scatter light. The light-shaping element can be divided into a plurality of sections. During the scanning each section can be projected to a different depth plane in the image space. In some embodiments, each zone can be projected to a different depth in the image space.

The method can also include scattering the scattered illumination from the light-shaping element in a vertical direction at the image space. This can increase the vertical dimension of a viewing zone.

In general, in another aspect, the invention features a three-dimensional display system that forms a three-dimensional image by providing components of the image in a series of frames to an image space. The three-dimensional display includes a spatial light modulator, a light-shaping element, which includes a number of zones, and a scanning optic, which projects an image of the light-shaping element to an image space. During operation, the scanning optic scans the image of the light-shaping element over the image space, and in each of several frames during the scan, the spatial light modulator selectively illuminates portions of the light-shaping element zones, and each zone scatters the illumination. Some of the illumination scattered by the light-shaping element provides a component of the three-dimensional image in the image space.

The three-dimensional display system can include any of the following features. The spatial light modulator can include a plurality of rows and columns of elements, and each row of elements can correspond to a zone of the light-shaping element. In some cases, each element of the spatial light modulator corresponds to a zone of the light-shaping element. Each zone of the light-shaping element can scatter illumination from the spatial light modulator into a predetermined trajectory, such as a horizontal and/or vertical trajectory. Each zone of the light-shaping element can be a grating (e.g., a transmission grating or a reflection grating). The light-shaping element can be partitioned into several light shaping element sections. Each light-shaping element section can include a plurality of zones, and each light-shaping element section can be positioned in a different plane along an axis (e.g., an optical axis). The light-shaping element can be a diffusing screen and can diffusely scatter illumination from the spatial light modulator. In such cases, the diffusing screen can be placed at a non-perpendicular angle with respect to an optical axis. Each of at least two zones of the light-shaping element can be projected to a different depth plane in the light-shaping element image.

The scanning optic in the three-dimensional display system can be a cylindrical polygonal scanner, which reflects light from the light-shaping element towards the image space. A condensing lens can be included in the optical path of the display system, which focuses illumination from the light-shaping element onto the scanning optic. A telecentric relay can also be included in the optical path of the display to relay the image of the light-shaping element to the image space. The display can also include a vertically diffusing screen positioned in the image space.

Embodiments of the invention have many advantages. For example, a three-dimensional display system can be easily converted from a stereoscopic display to a volumetric display by replacing a single optical component in the display (e.g., the light-shaping element). Moreover, the three-dimensional display system can exhibit properties of both a volumetric display and a stereoscopic display in a single embodiment. Additionally, switching one or two of the optical components can easily convert a stereoscopic display between a horizontal-parallax-only display and a full-parallax display.

Unless otherwise defined, all technical and scientific terms used herein have the same meaning as commonly understood by one of ordinary skill in the art to which this invention belongs. Although methods and materials similar or equivalent to those described herein can be used in practice or testing of the present invention, suitable methods and materials are described below. All publications, patent applications, patents, and other reference materials mentioned herein are incorporated by reference in their entirety. In case of conflict, the present specification, including definitions, will control. In addition, the materials, methods and examples are illustrative only and not intended to be limiting.

Other features and advantages of the invention will be apparent from the following detailed description, and from the claims.

DESCRIPTION OF DRAWINGS

FIGS. 5A–K are schematic snapshots of an image plane in a horizontal-parallax-only display at different time frames during a scan;

Like reference symbols in the various drawings indicate like elements.

DETAILED DESCRIPTION

Figure 1:
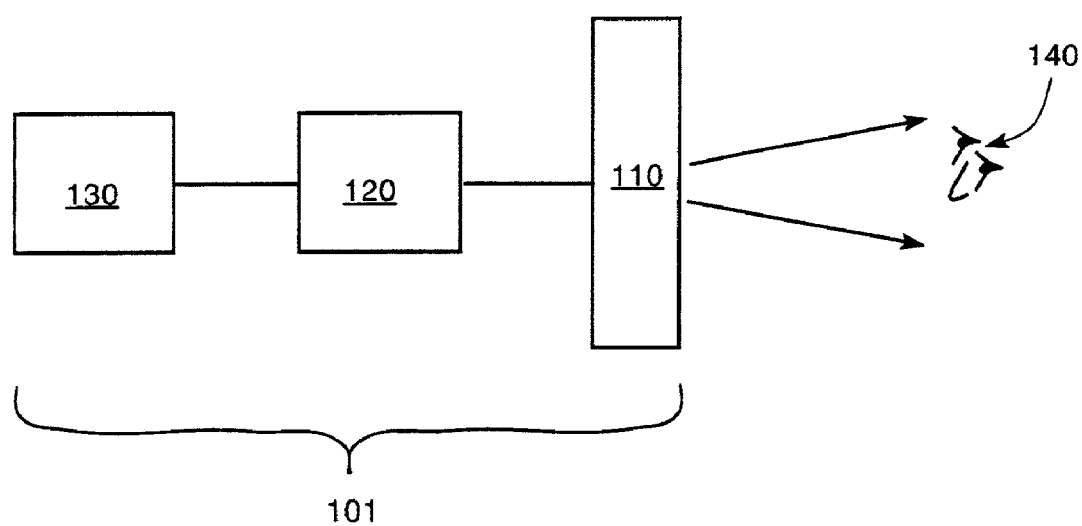
FIG. 1 is a schematic diagram of an embodiment of a horizontal-parallax-only display.

Referring to FIG. 1, a horizontal-parallax-only (HPO) display 101 includes electronic components 130, which provide image data to a spatial light modulator (SLM) driver 120. SLM driver 120 converts the image data into electrical pulses of appropriate voltage and timing to drive a SLM contained in display optics 110. Display optics 110 converts the image data into optical information, thereby providing a stereoscopic image to an observer 140 positioned in the viewing zone of display 101.

Figure 2:
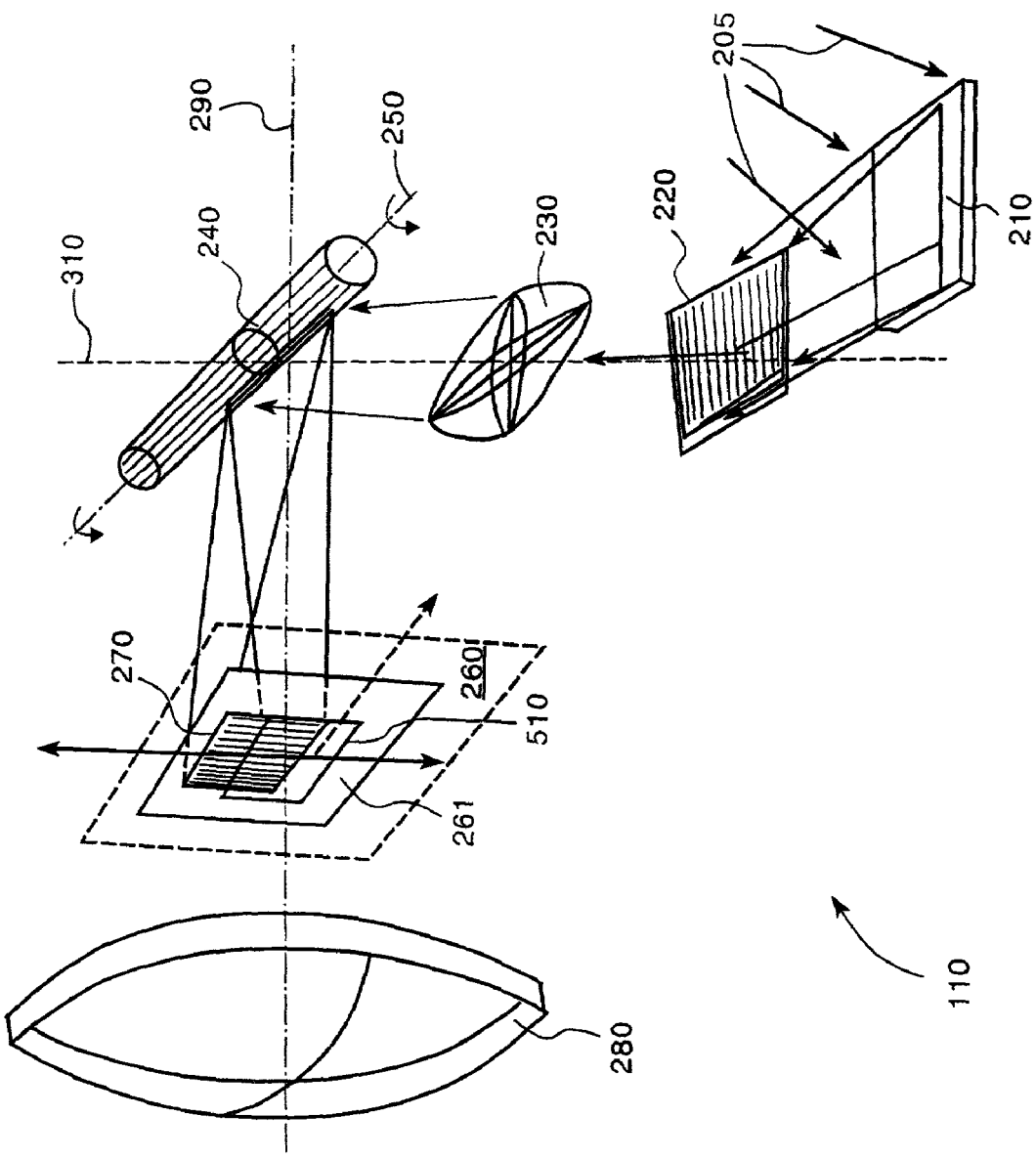
FIG. 2 is a perspective view of an embodiment of horizontal-parallax-only display optics.
Figure 3:
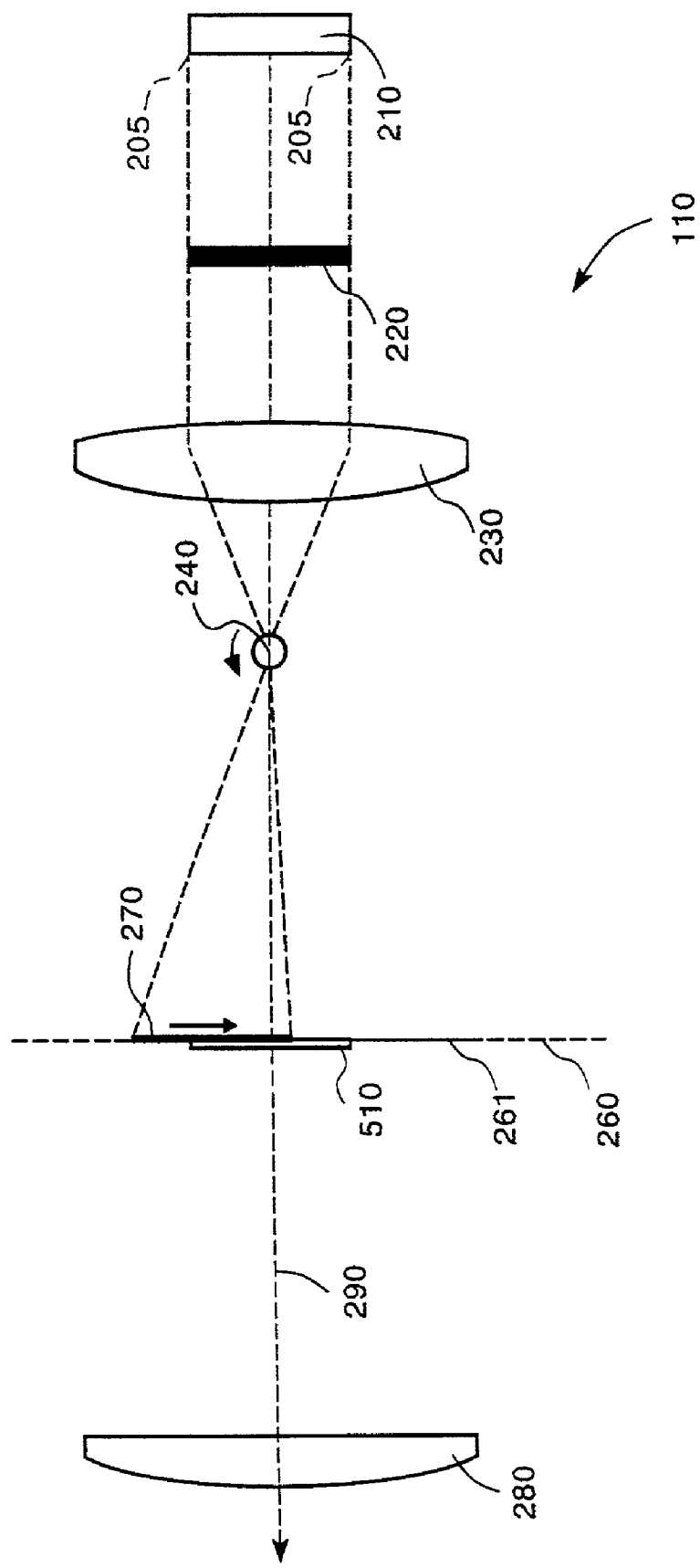
FIG. 3 is a schematic of an embodiment of horizontal-parallax-only display optics, shown with an unfolded optical path.

Referring now to FIGS. 2 and 3, display optics 110 includes a spatial light modulator (SLM) 210, which selectively directs collimated light 205 from a light source to a light-shaping element 220. Display optics 110 further includes a condensing lens 230 that focuses light from light-shaping element 220 onto a cylindrical polygonal scanner 240. During operation, cylindrical polygonal scanner 240 rotates about a horizontal rotation axis 250, thereby scanning an image 270 of light-shaping element 220 vertically downwards over an image space 510 in plane 260. A vertically diffusing sheet 261 is placed at plane 260 to enlarge the viewing zone of the three-dimensional image in the vertical direction. Display optics 110 also includes an output lens 280, which magnifies the image 270 of light-shaping element 220 in plane 260 for the observer, who is positioned on the opposite side of output lens 280 from image 270.

To aid in the description, it is useful to define three orthogonal axes, namely a vertical axis 310, a horizontal axis, which is the same as horizontal rotation axis 250, and a depth axis 290. The observer typically positions their eyes in a horizontal plane, and looks down depth axis 290 towards output lens 280. The observer focuses on a re-imaged three-dimensional scene, which hovers between output lens 280 and the observer's eyes. Vertical axis 310, depth axis 290, and horizontal rotation axis 250 correspond to the vertical, depth, and horizontal dimensions of the three-dimensional image as perceived by the observer.

Depth axis 290 is parallel to the optical axis, which is shown unfolded in FIG. 3. The above-defined axes will be used in reference to the unfolded optical path throughout the description. This is done to avoid any ambiguity that may arise when referring to directions and planes in the folded optical path shown in FIG. 2.

SLM 210 is a reflective micro electromechanical device, such as a Texas Instruments DMD™, which consists of an array of independently switchable micro-mirrors. The array size depends on the choice of SLM, but will typically include several hundred rows and several hundred columns of micro-mirrors (e.g., an XGA device having 1,024×768 resolution). Micro-mirrors have an "on" state and an "off" state. In the "on" state, a micro-mirror reflects a beam of collimated light from the light source toward a portion of light-shaping element 220. In the "off" state, a micro-mirror directs light from the light source away from the light-shaping element. During operation, SLM driver 120 (see FIG. 1) supplies an electrical signal that controls the state of the mirrors.

Figure 4A:
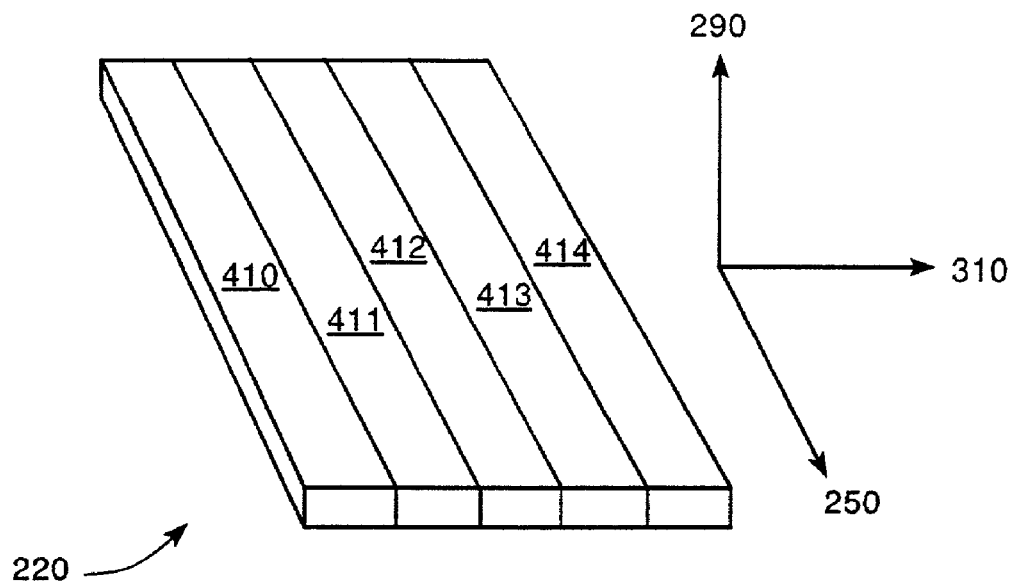
FIG. 4A is a perspective view of an embodiment of a light-shaping element.
Figure 4B:
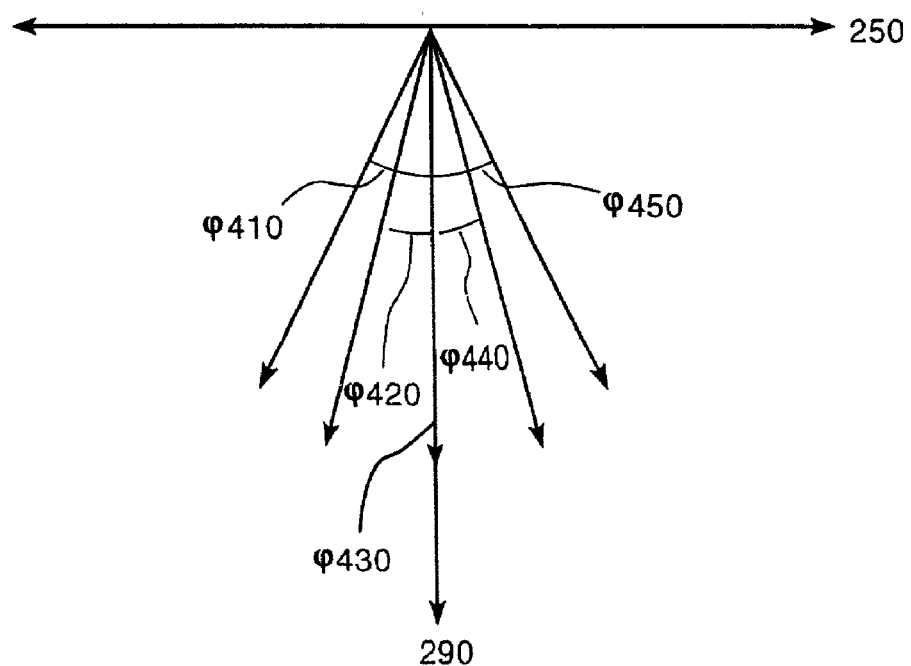
FIG. 4B is a plot showing exemplary ray trajectories in a horizontal plane.
Figure 5J:
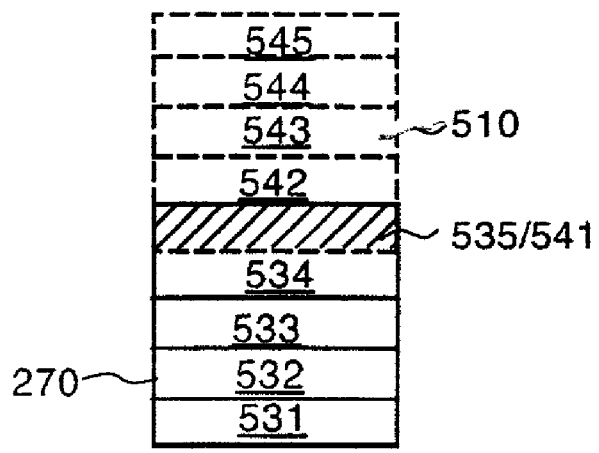
Figure 5K:
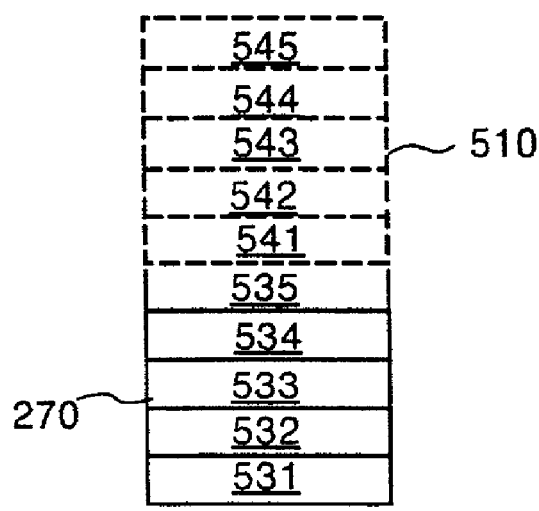

Light-shaping element 220 lies in a plane perpendicular to the (optical) depth axis 290. Referring now to FIGS. 4A and 4B, light-shaping element 220 includes several zones 410–414, each of which is a transmission grating. Zones 410–414 are stacked vertically, each extending horizontally across light-shaping element 220. The transmission grating in each zone has a grating period and orientation designed to direct collimated light beams from the SLM into predetermined trajectory in a horizontal plane. Each trajectory is defined by a corresponding angle with respect to the depth axis 290. These angles span a range in the horizontal plane (see FIG. 4B). For example, a light beam transmitted through zone 410 of light-shaping element 220 (FIG. 4A) is scattered into a trajectory at angle $\phi_{410}$ with respect to depth axis 290. Similarly, light beams transmitted through zones 411–414, are scattered into trajectories at angles $\phi_{411-414}$, respectively. Hence, each zone provides light from SLM 210 with a unique trajectory in a horizontal plane.

For simplicity, FIG. 4A shows light-shaping element 220 as having five zones. Actually, light-shaping element 220 has a zone corresponding to each row of mirrors in the mirror array of the SLM. This can be as many as several hundred, or even thousands, of zones (e.g., 768 zones for an XGA SLM). As each zone provides a different horizontal trajectory, the number of rows in the SLM defines the angular resolution of the range of trajectories provided by the light-shaping element. This means that each zone in the light-shaping element (corresponding to each row of mirrors in the SLM) contributes a different light ray trajectory to the three-dimensional image.

The number of columns in the SLM determines the horizontal spatial resolution of the image. Mirrors in different columns of the same row illuminate different portions of the same zone of the light-shaping element. Hence, when projected to the image space, light rays originating from different portions of the same light-shaping element zone will appear to the observer to have the same angular trajectory, but will originate from different areas of the image.

Referring back to FIGS. 2 and 3, condensing lens 230 focuses light transmitted by light-shaping element 220 to cylindrical polygonal scanner 240, and projects an inverted image of light-shaping element 220 at image plane 260. Condensing lens 230 focuses light propagating parallel to depth axis 290 and light propagating in a horizontal plane (e.g., light directed by the light-shaping element). Extraneous light rays, such as those rays with a vertical trajectory component, are not focused to cylindrical polygonal scanner 240, and are not projected to image plane 260.

As cylindrical polygonal scanner 240 rotates, it scans an image 270 of the light-shaping element in a vertical direction over image space 510 in image plane 260. Hence, the apparent source of a light ray to the observer (who is focused on image plane 260) depends on the position of image 270 in the scan. By switching an appropriate micro-mirror "on" at the correct time during the scan, the display can project a light ray originating from the micro-mirror to any desired vertical location in image space 510.

FIGS. 5A–K each show a frame in a time sequence of one scan of image 270 over image space 510 as perceived from the position of the observer. The orientation of horizontal axis 250 and vertical axis 310 are included for reference. Image space 510 is the same size as image 270, and each of zones 531–535 in image 270, is sequentially imaged to each image space zone (541–545) during the scan. Recall that each zone of the light-shaping element provides light rays with a characteristic horizontal trajectory. By scanning each zone 531–535 in the image to each image space zone 541–545, the system can generate light rays of any characteristic trajectory from the light-shaping element to any portion of image space 510. Image 270 is scanned vertically over image space 510 at a rate of at least about 20 Hz, rapidly enough so that persistence of the observer's vision fuses the light projected to the image plane during one scan into a single, flicker-free image.

FIG. 5A shows a frame of light-shaping element image 270 and image space 510 at time t=0. Light-shaping element image 270 is imaged just above image space 510 with no overlap. At this time, the SLM does not direct any light to the light-shaping element, so there are no light rays directed by the scanner toward the image plane. In this frame there is no contribution to the image.

FIG. 5B shows a similar frame, now at time t=1 in the scan. Image 270 is scanned downward so that zone 531 of image 270 is projected to image space zone 545. At this time, the SLM directs light to the lower-most zone of the light-shaping element as needed. This light is projected to image space zone 545, contributing light rays of a first trajectory to the image at image space zone 545. No light is directed to zones 532–535 of image 270.

FIG. 5C shows a frame at time t=2 in the scan. The cylindrical polygonal scanner scans image 270 further down from its position in FIG. 5B, and image zones 531 and 532 are projected to zones 544 and 545 of image space 510, respectively. Now the SLM directs light to the two lower-most zones of the light-shaping element as needed, providing light rays having the first trajectory to image space zone 544, and light rays having a second trajectory to image space zone 545.

FIGS. 5D–K show frames at times t=3 to 10, respectively, in the scan. Image 270 advances over image space 510, until each zone of image 270 is projected to each image space zone. In each frame, the hatched zones in the figures of image 270 are projected to zones of image space 510. These are considered active zones, as the light projected to these zones in each case contributes to the three-dimensional image.

To briefly summarize, during a single scan the HPO display system provides light rays having any of N different trajectories to N×M discrete points in the image space, where N is the number of rows and M is the number of columns of the SLM.

Note that the scan sequence illustrated in FIGS. 5A–K shows image 270 being completely scanned over image space 510 before a new scan begins. This results in significant 'dead space', particularly in frames at t=0 and t=10, wherein no light-shaping element zones are projected to image space 510. In general, scan sequences with less dead space can be used. For example, a scanning optic could be used which 'wraps' the bottom zones of the light-shaping element image around to the top of the image space while the top image zones are being imaged to the bottom of the image space. Typically, the more seamless the projected images between scans, the less likely the displayed image will appear to flicker.

Figure 6A:
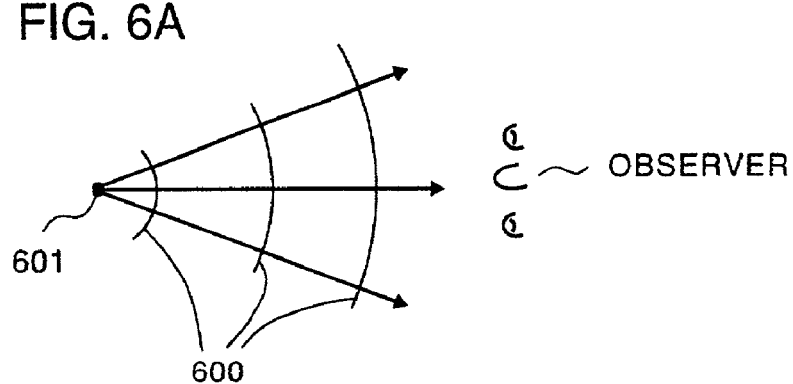
FIG. 6A is a schematic diagram of a horizontal slice of a light field emitted by a point source.
Figure 6B:
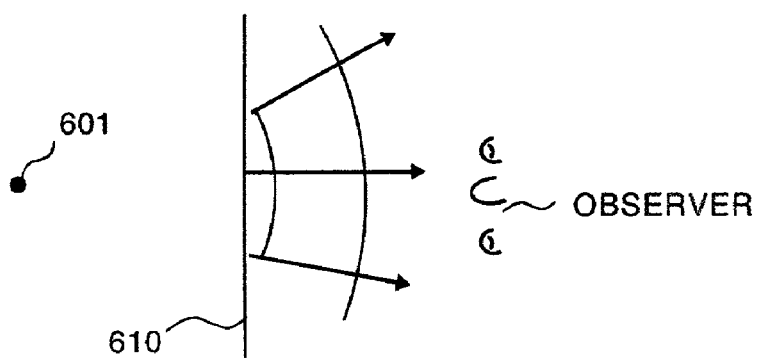
FIG. 6B is a schematic diagram of a horizontal slice through a hypothetical horizontal-parallax-only display.
Figure 6C:
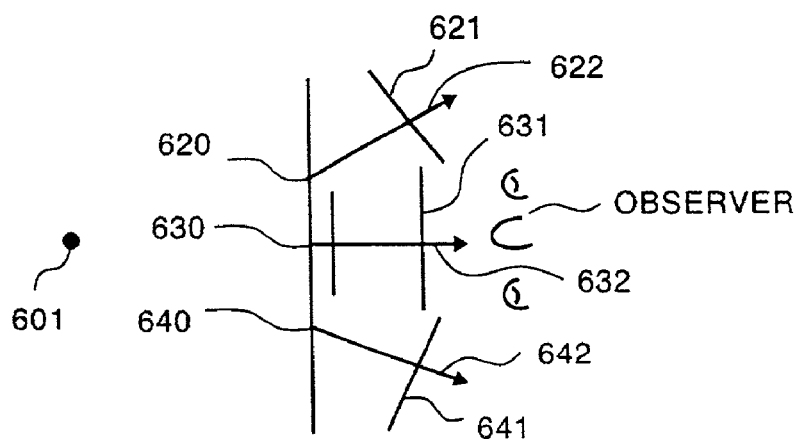
FIG. 6C is a schematic diagram of a horizontal slice through an embodiment of a horizontal-parallax-only display.

Before describing how the HPO display actually generates a three-dimensional image, it is instructive to review the general principles involved in an image's formation. Stereoscopic displays present spatial information to an observer by recreating the light field (e.g., wavefront) emitted (or reflected) by physical objects. Referring to FIGS. 6A–C, to illustrate this, consider a two-dimensional, horizontal slice through the light field emitted 600 by a single diverging point source 601. This slice is taken in the same plane as an observer's eyes. The light field from the actual point source (FIG. 6A) has a constant radius of curvature. An ideal, hypothetical stereoscopic display 610 reconstructs this light field exactly (FIG. 6B), providing the observer with an image of the point source. While hypothetical display 610 reconstructs the light field of point source 601 exactly, providing a perfect reconstruction of point source 601 for the observer, such a device is difficult to implement, especially for a dynamic image. In other words, it is nontrivial to perfectly recreate a temporally changing sequence of continuous light fields to exactly recreate a changing three-dimensional image. In order for hypothetical display 610 to create the light field of a new point, or if the original point moves, the entire display area must be adapted to create the light field of the new image.

A more practical approach is to approximate the light field of point 601 in a piecewise fashion (FIG. 6C). Here, discrete elements of the display 620, 630, and 640 each generates a corresponding plane wave 621, 631, and 641, respectively. Plane waves 620, 630, and 640 propagate along trajectories 622, 632, and 642, respectively. Together, plane waves 621, 631, and 641 approximate the continuous light field from point 601 at the observer's position. This is analogous to generating a two-dimensional image with an array of discrete pixels (e.g., in a flat panel display), which approximates the continuous intensity distribution from an image.

Figure 7A:
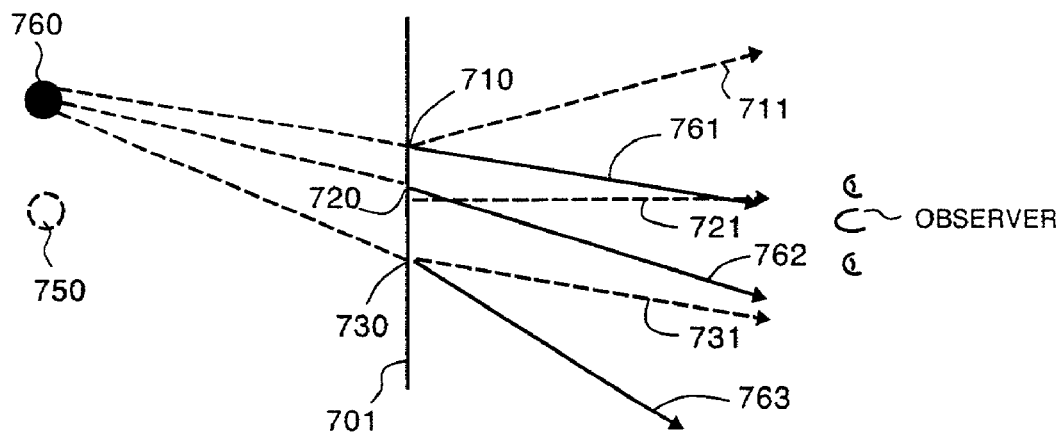
FIGS. 7A–C are schematic diagrams of a horizontal slice through an embodiment of a horizontal-parallax-only display.
Figure 7B:
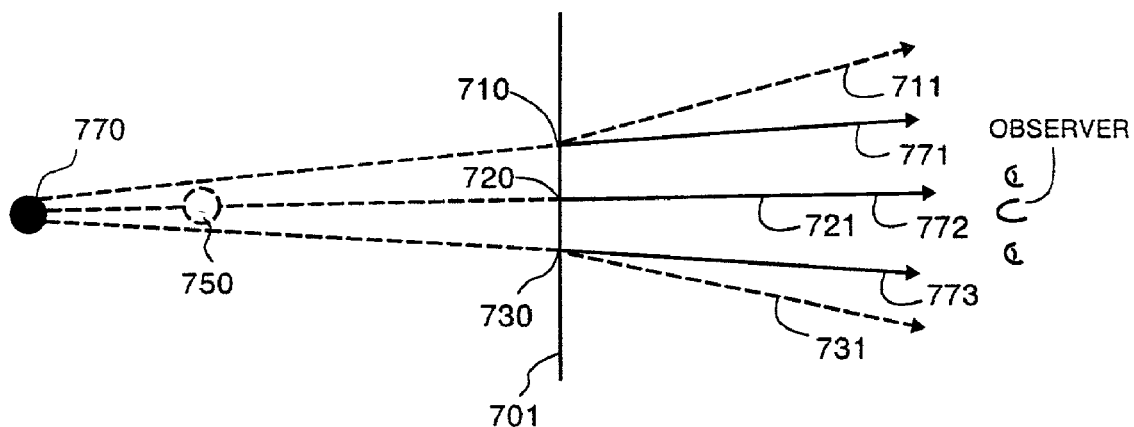
Figure 7C:
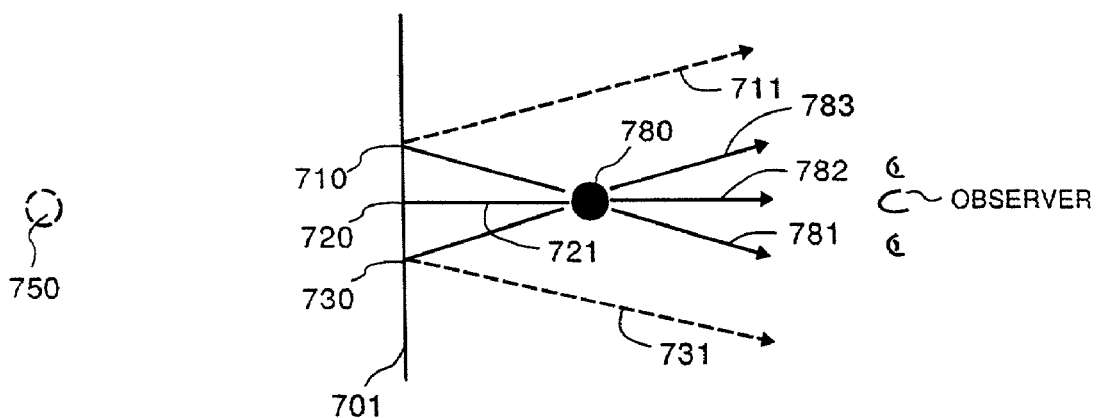

This piecewise approximation of a light field is more amenable to display a dynamic image, as the plane wave trajectory from each discrete element of the display can be adapted to display changes in the image. This is illustrated by the following example. Referring to FIGS. 7A–C, consider a point source 750 in a horizontal plane of a three-dimensional image provided to an observer by three respective plane waves. Each of light rays 711, 721, and 731 depicts the corresponding trajectory of each of the three plane waves. Elements 710, 720, and 730 of display 701 generate light rays 711, 721, and 731, respectively. To display a new point 760, laterally displaced from point 750, display 701 adapts display elements 710, 720, and 730 to provide new plane waves with the trajectories of rays 761, 762, and 763, respectively (see FIG. 7A). The new plane waves approximate a light field emitted from new point 760.

While point 760 appears laterally displaced from point 750, this approximation process can simulate the light fields of points at different depths in space as well. For example, to display point 770, which is positioned further from the observer than point 750, display 701 generates plane waves having ray trajectories 771, 772, and 773 from elements 710, 720, and 730, respectively. Light rays 771, 772, and 773 diverge less rapidly than light rays 711, 721, and 731, thereby approximating the light field of a point further from the observer than point 750 (see FIG. 7B). Alternatively, if display 701 is adapted to provide plane waves depicted as convergent rays 781, 782, and 783, the light field will approximate that of a point 780 between display 701 and the observer (see FIG. 7C).

Note that in generating an image of points at different depths and positions in a three dimensional image, display 701 emits light rays with carefully selected trajectories, originating from appropriate locations in an image plane.

Figure 8A:
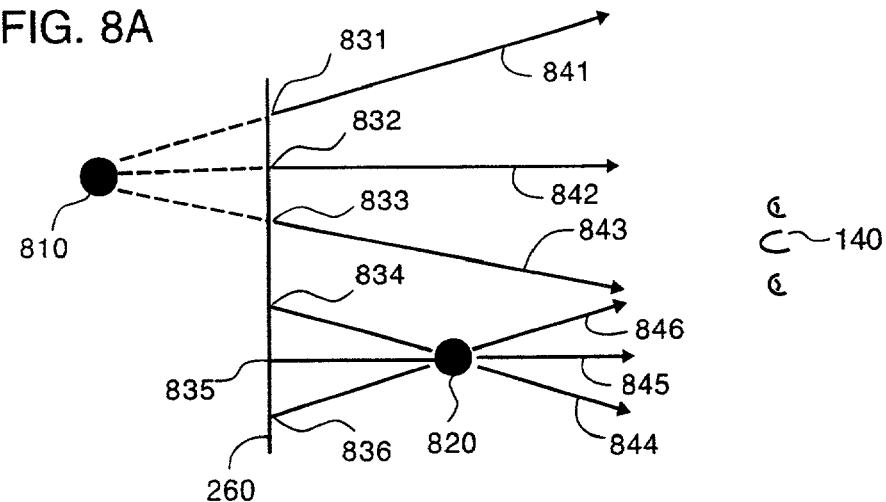
FIG. 8A is a schematic diagram of a horizontal slice through an image space of an embodiment of a horizontal-parallax-only display.

Referring now to FIG. 8A, to illustrate how the HPO display of the described embodiment generates a three-dimensional image, consider an exemplary image including two points, 810 and 820, in a horizontal viewing plane. One point, point 810, is located on the opposite side of image plane 260 from observer 140. The other, point 820, is located on the same side of image plane 260 as observer 140. The light field for each of points 810 and 820 is constructed with three plane waves, having trajectories shown as rays 841–846. The plane waves for both points 810 and 820 emanate from six different locations in image plane 260. The plane waves propagating as light rays 841, 842, and 843, emanate from points 831, 832, and 833 of image plane 260, providing a light field diverging from point 810 as perceived by observer 140. The plane waves propagating as light rays 844, 845, and 846 emanate from points 834, 835, and 836, respectively, and converge to point 820. Light ray pairs 841 and 846, 842 and 845, and 843 and 844 propagate along respective parallel trajectories.

Figure 8B:
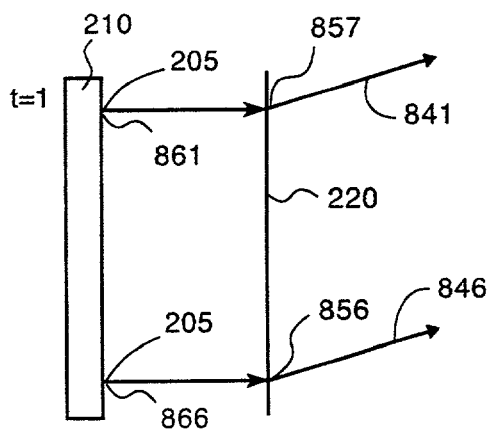
FIGS. 8B–D are schematic diagrams of a horizontal slice through an SLM and a light-shaping element in an embodiment of a horizontal-parallax-only display.
Figure 8C:
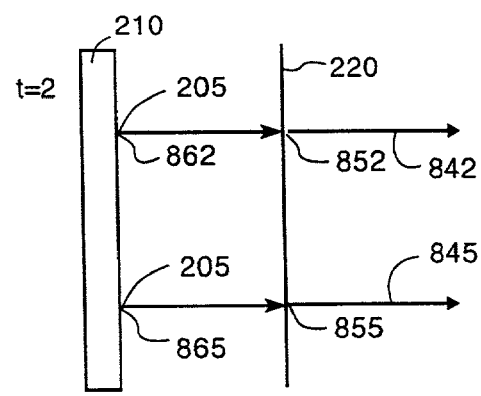
Figure 8D:
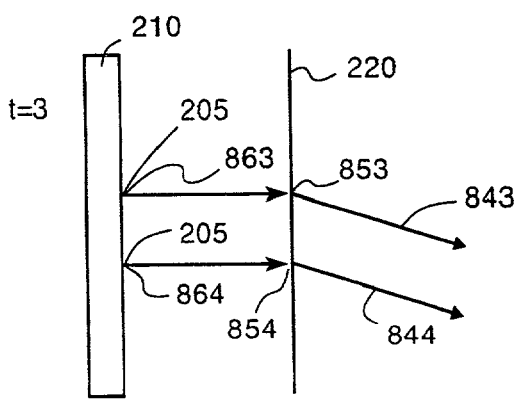

In FIG. 8A, light rays 841–846 are depicted as originating simultaneously from image plane 260, the focal plane of observer 140. Referring now to FIGS. 8B–D, rays 841–846 are actually generated in three frames by SLM 210 and light-shaping element 220. These rays are projected to image plane 260 by the cylindrical polygonal scanner as it scans the image of light-shaping element 220 over image plane 260.

In frame t=1 of the scan (see FIG. 8B), mirrors in the "on" state at locations 861 and 866 in a first row of SLM 210 direct light to portions 851 and 856 of a first zone of light-shaping element 220. The first light-shaping element zone scatters the light into the trajectories shown as rays 841 and 846. The condensing lens and cylindrical polygonal scanner (not shown in FIG. 8B) relay rays 841 and 846 to image plane 260, where they form part of the light field for points 810 and 820, respectively.

At a later time frame in the scan, t=2 (see FIG. 8C), mirrors at locations 862 and 865 in a second row of SLM 210 direct light to portions 852 and 855 of a second zone of light-shaping element 220. The second light-shaping element zone scatters the light into the trajectories shown as rays 842 and 845, which contribute to the light field of the image as described above.

At a still later time frame in the scan, t=3 (see FIG. 8D), mirrors at 863 and 864 in a third row of SLM 210 direct light to portions 853 and 854 of a third zone of light-shaping element 220. The third zone scatters this light into the trajectories shown as rays 843 and 844. The cylindrical polygonal scanner projects rays 843 and 844 to elements 833 and 834 (see FIG. 8A) in image plane 260. As the entire scan occurs in less than about 1/20 of a second, persistence of vision perceives light rays 841–846 to belong to a single light field, constructing points 810 and 820 for the observer.

Figure 9:
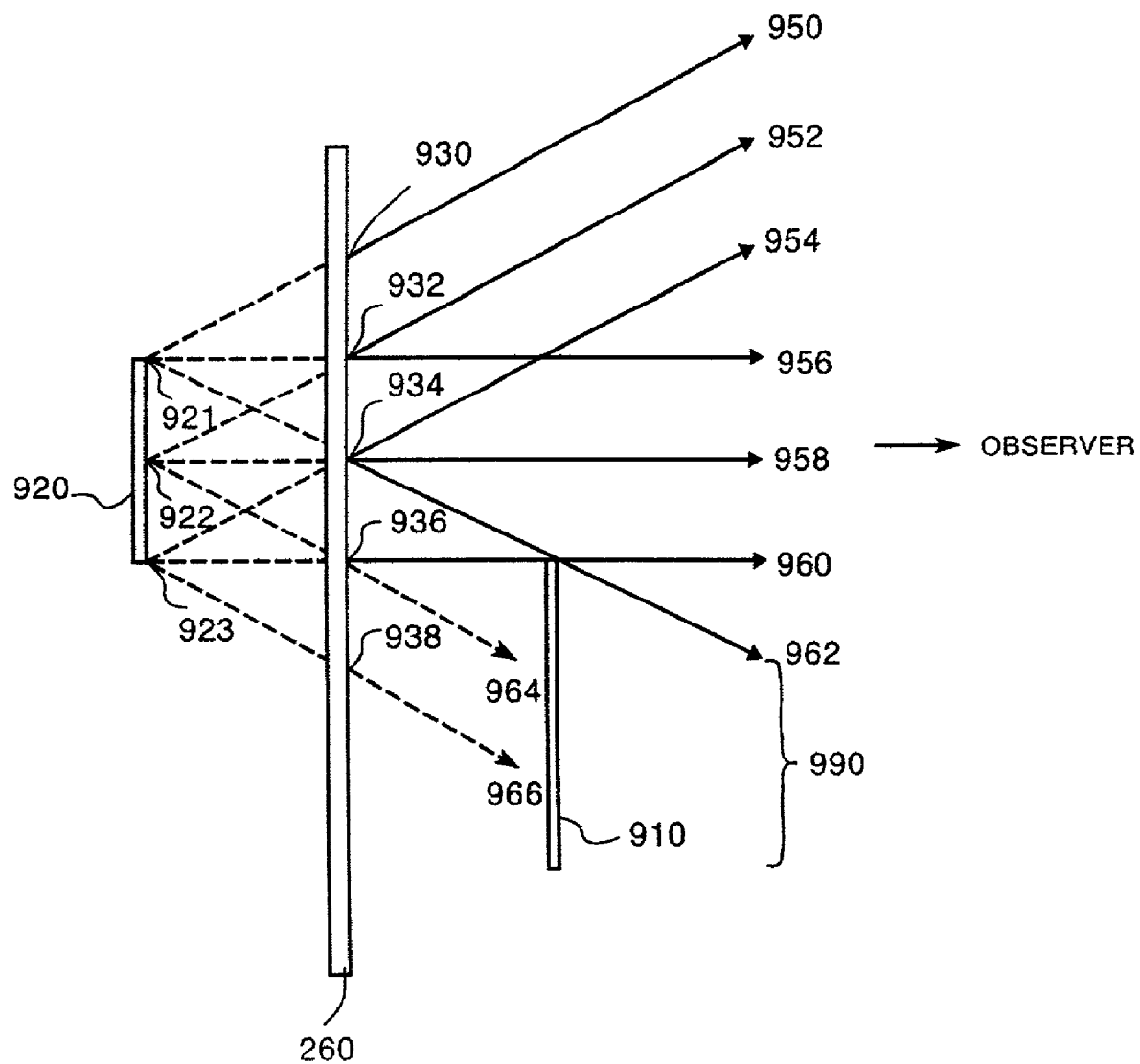
FIG. 9 is a schematic diagram of a horizontal slice through an image space of an embodiment of a horizontal-parallax-only display.

The above-described HPO display provides for occlusion in three-dimensional images. This property stems from the display's ability to modulate the intensity of discrete light field portions (e.g., each plane wave) in an image. Occlusion occurs when a first element blocks another element from view in at least a portion of the image. This happens naturally in true three-dimensional scenes when the first element is in the observer's direct line of sight to the second element. Occlusion is an important depth cue to an observer. The following example illustrates how the HPO display provides occlusion in an image. Referring to FIG. 9, part of a three-dimensional image includes two lines, 910 and 920, in a horizontal viewing plane. To create line 920, which is positioned behind image plane 260 with respect to an observer, the HPO display emits light from image plane 260 at locations 930, 932, 934, and 936, thereby approximating three co-linear point sources at positions 921, 922, and 923. Location 930 emits a plane wave with trajectory 950, location 932 emits plane waves with trajectories 952 and 956, location 934 emits plane waves with trajectories 954, 958, and 962, and location emits a plane wave with trajectory 960. Line 920 is positioned in front of image plane 260 with respect to the observer. At position 990, the observer will see only line 910, as line 910 is directly between the observer and line 920, and therefore occludes line 920. In the absence of line 910, HPO display would emit plane waves with trajectories 964 and 966 from locations 936 and 938, and line 920 would be observable from position 990. Note that to avoid making FIG. 9 unnecessarily complicated, plane wave trajectories for line 910 have been omitted.

Figure 10:
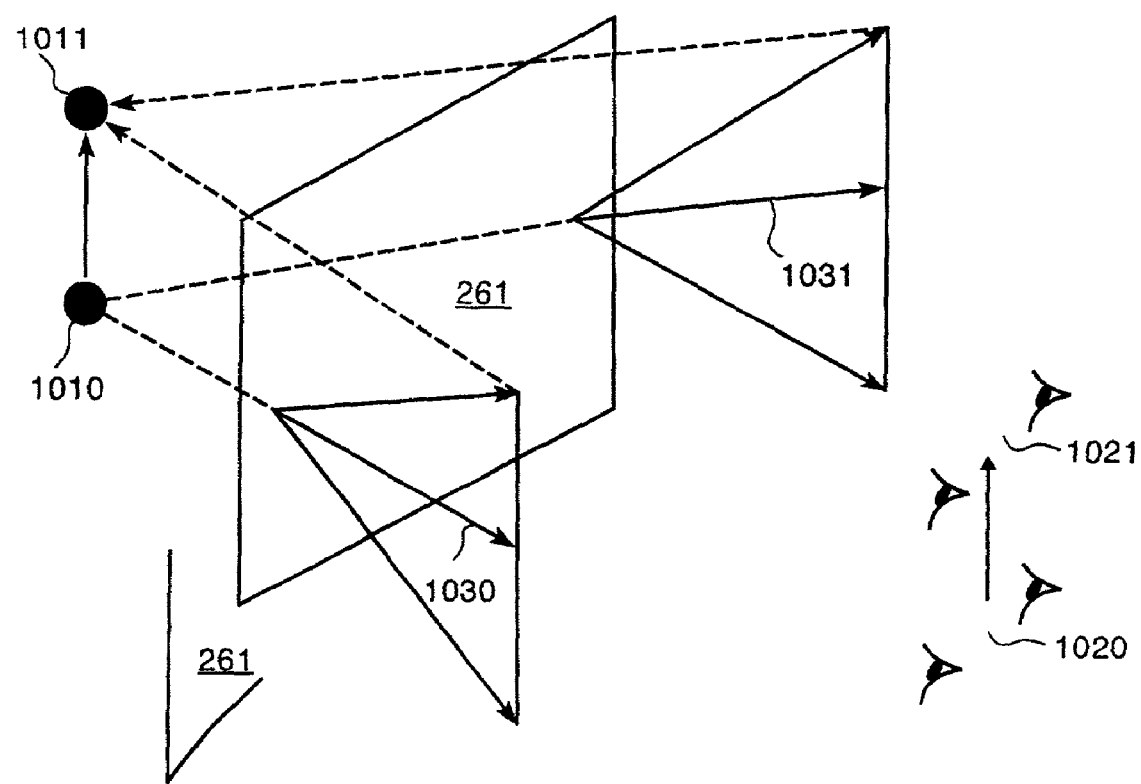
FIG. 10 is a perspective view of a vertically-diffusing screen in an embodiment of a horizontal-parallax-only display.

Referring to FIG. 10, vertical diffusing screen 261 placed at image plane 260 diffusely scatters the imaged light field in the vertical direction, thereby enlarging the vertical viewing zone. As diffusing screen 261 only diffuses light in the vertical direction, the shape of the light field in the horizontal plane is unaffected by diffusing screen 261. This effect is illustrated by considering a point 1010, for example. Diffusing screen 261 scatters the light field constituting imaged point 1010 into a range of vertical trajectories in the viewing zone. Imaged point 1010 is constructed at position 1020 by a light field including rays 1030 and 1031. The display projects rays 1030 and 1031 to points 1040 and 1041 on vertical diffusing screen 261, where the rays are diffused in the vertical direction. As the observer moves vertically to a second position 1021, he/she perceives point 1010 as vertically displaced point 1011. The position of the point tracks the observer's head movement and the three-dimensional image does not substantially change.

Figure 11:
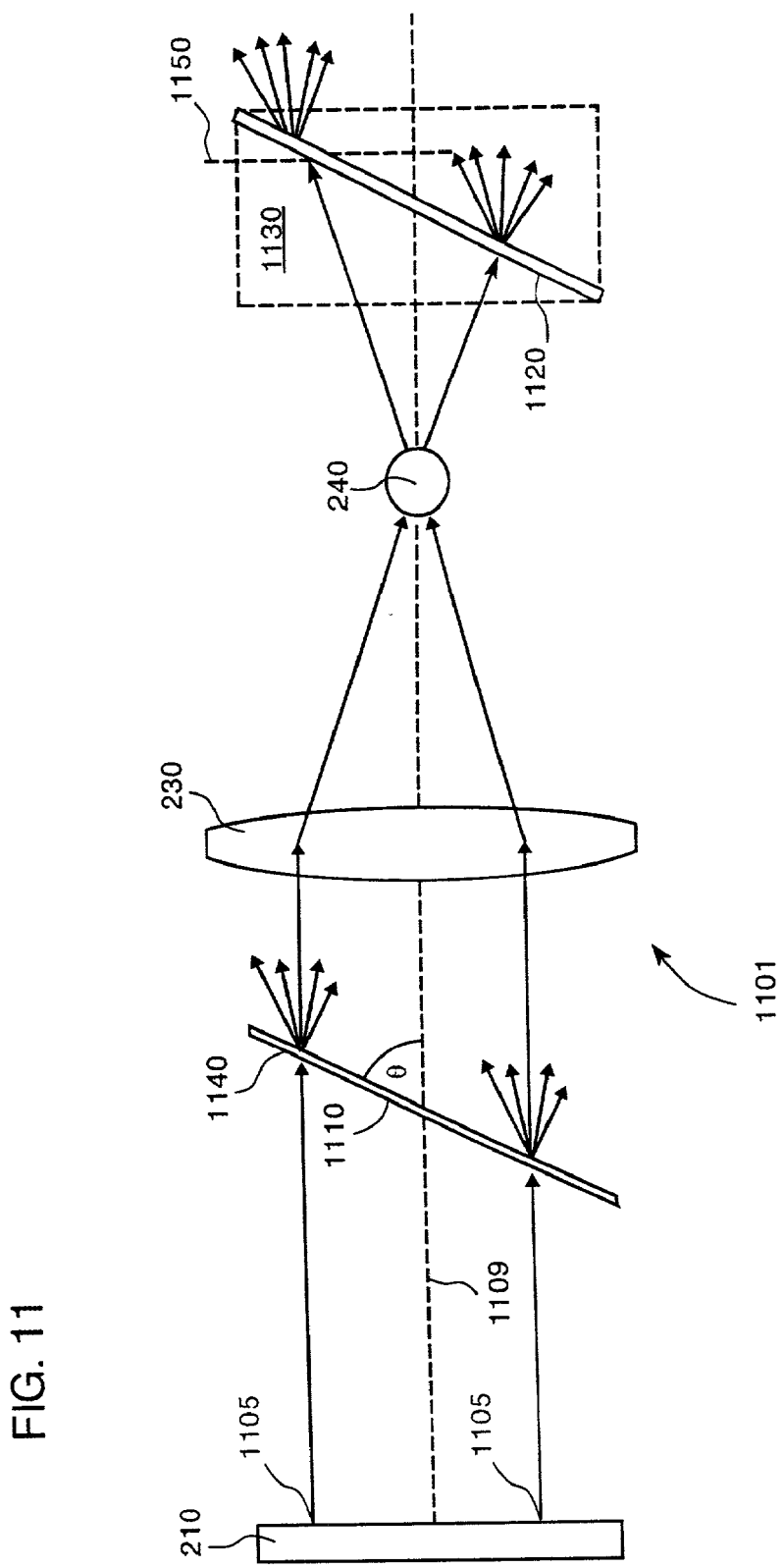
FIG. 11 is a schematic diagram of an embodiment of a volumetric display with the optical path shown unfolded.

The current embodiment provides a multi-view HPO image, similar to a holographic stereogram. In some embodiments, the display can be adapted to provide a volumetric image instead. Referring to FIG. 11, a light-shaping element scatters light at different locations along the optical axis 1109. When projected to an image volume, this light generates a volume-filling image for an observer. Note that display optics 1101 is identical to display optics 110 (see FIG. 3), with the exception of the light-shaping element. The light-shaping element in display optics 1101 is a diffusing screen 1110, tilted at an angle $\theta$ with respect to (unfolded) optical axis 1109. SLM 210 selectively directs collimated light 1105 from a light source towards diffusing screen 1110. Diffusing screen 1110 diffusely scatters the collimated light from SLM 210. Condensing lens 230 focuses light collimated in the vertical direction, and light scattered into a range of diverging trajectories in the horizontal direction onto polygonal scanning mirror 240. Polygonal scanning mirror 240 scans an image of diffusing screen 1110 vertically over a volume. The portion of this volume through which the entire image of diffusing screen 1110 is scanned defines an image volume 1130.

As the image of diffusing screen 1110 is scanned over image volume 1130, each horizontal zone of the diffuser scans out a different depth plane (e.g., a plane perpendicular to optical axis 1109) in image volume 1130. Polygonal scanner 240 projects light scattered by a point 1140, for example, on diffusing screen 1110 to a depth plane 1150 in image volume 1130. The vertical location of the projected point in image volume 1130 depends the position of the light-shaping element image in the scan when the light is generated. Display optics 1101 can address N×M points in each depth plane in image volume 1130, where N×M is the resolution of SLM 210.

Figure 12A:
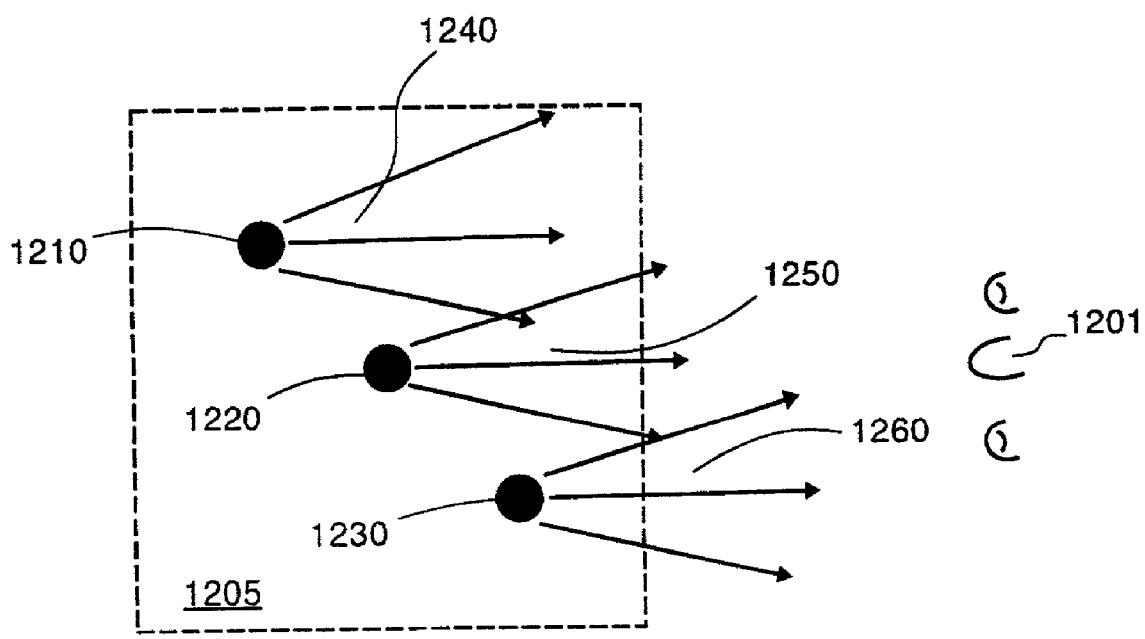
FIG. 12A is a schematic diagram of a horizontal slice through an image space of an embodiment of a volumetric display.

To illustrate how display optics 1101 generates a three-dimensional image, consider a simple example of an image that includes three points in a horizontal plane of image volume 1130. Referring to FIG. 12A, the display optics projects points 1210, 1220, and 1230 into a horizontal plane 1205 to an observer 1201. Each of points 1210, 1220, and 1230 are points of convergence of diffusely scattered light 1240, 1250, and 1260 respectively. The intensity of light diverging from each point cannot be modulated in a particular direction. Hence, it is not possible for one point to occlude another in this image.

Figure 12B:
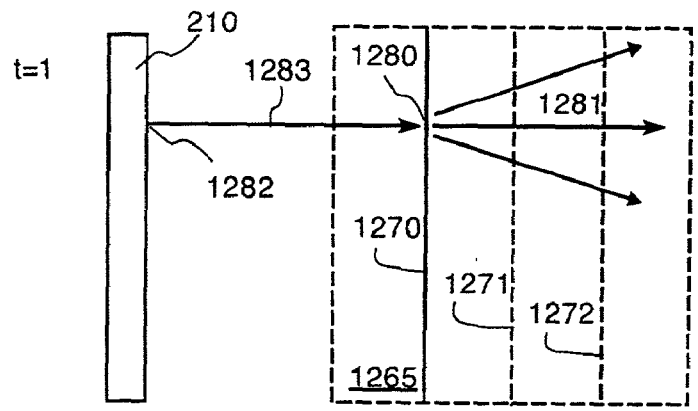
FIGS. 12B–D are schematic diagrams of a horizontal slice through an SLM and a light-shaping element in an embodiment of a volumetric display.

Each of the three points in horizontal plane 1205 is generated in a single, different time frame during a scan as follows. Referring to FIG. 12B, which shows a horizontal slice through SLM 210 and the diffusing screen at a horizontal zone 1270. The horizontal projection of the diffusing screen is shown as area 1265. At time t=1 in the scan, the cylindrical polygonal scanner projects horizontal zone 1270 of the diffusing screen to horizontal plane 1205 in the image volume. A mirror located at a point 1282 in a first row of SLM 210 directs a beam of light 1283 to a portion 1280 of zone 1270 on the diffusing screen. The diffusing screen diffusely scatters the light beam 1283. The condensing lens and cylindrical polygonal scanner (not shown) relay scattered light 1281 to point 1210 in horizontal plane 1205 (see FIG. 12A) of the image volume.

Figure 12C:
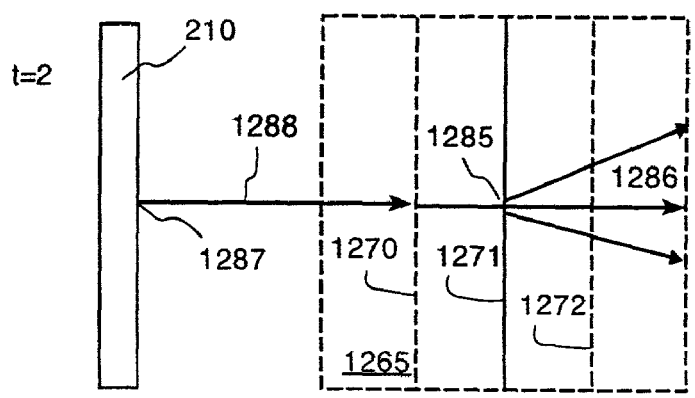

Referring to FIG. 12C, at a later time in the scan, t=2, a second horizontal zone 1271, further from SLM 210 than zone 1270, is projected to a second depth plane in horizontal plane 1205 of the image volume. A mirror located in a second row at location 1287 of SLM 210 directs a beam of light 1288 to a point 1285 in horizontal zone 1271 of the diffusing screen, where the light beam is diffusely scattered. Scattered light 1286 is focused onto the polygonal scanner and is projected to horizontal plane 1205 in the image volume as point 1220.

Figure 12D:
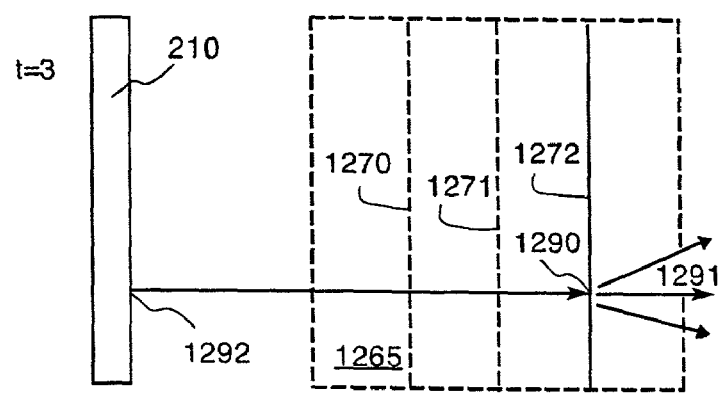

Referring now to FIG. 12D, at a still later time in the scan, t=3, a third horizontal zone 1272 is projected to horizontal plane 1205 in the image volume. As above, scattered light 1291, from point 1290 in horizontal zone 1272, is projected to point 1230 in horizontal plane 1205 in the image volume (see FIG. 12A). Scattered light 1291 originates from a mirror at location 1292 in SLM 210. The entire scan is completed in a time period sufficiently small (e.g., less than 50 milliseconds) for the observer's persistence of vision to fuse points 1210, 1220, and 1230 into a single three-dimensional image.

Figure 13A:
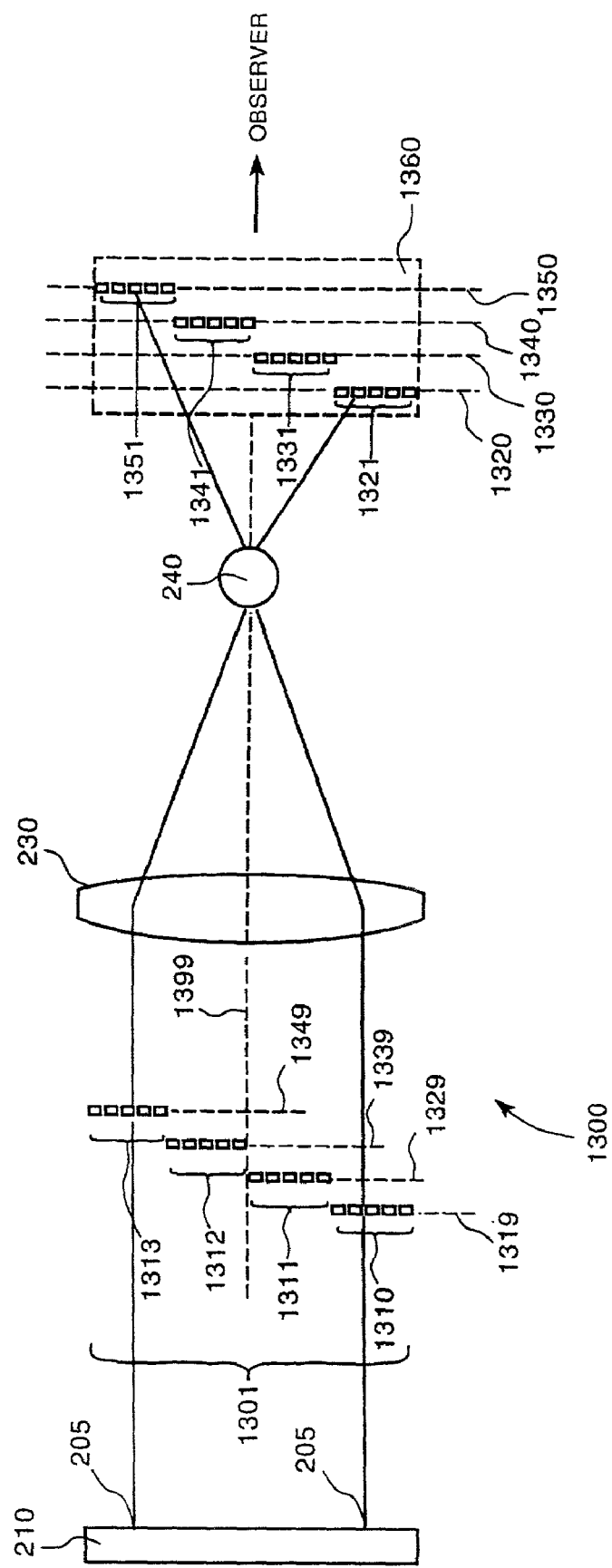
FIG. 13A is a schematic diagram of an embodiment of a volumetric horizontal-parallax-only display.
Figure 13B:
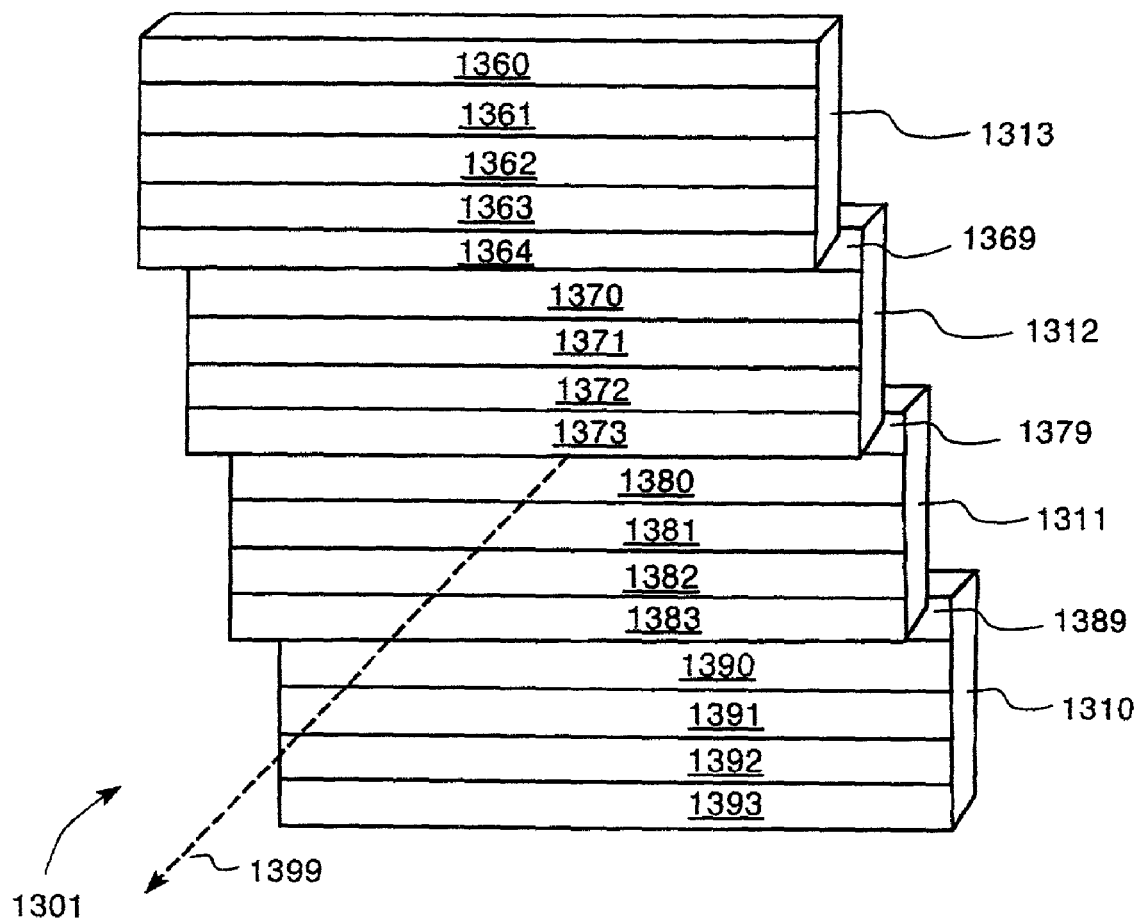
FIG. 13B is a perspective view of an embodiment of a light-shaping element.

Embodiments of a stereoscopic HPO display and a volumetric display have now been described. The light-shaping element is the only optical component that differs between the display optics of these displays. In some embodiments, a light-shaping element can provide a structured light field (e.g., similar to the light field generated by the HPO display) to multiple depth planes in an image volume, thereby combining elements of a stereoscopic and volumetric three-dimensional image. Referring to FIGS. 13A and B, a hybrid light-shaping element 1301 is included in display optics 1300. Light-shaping element 1301 includes several similar sections 1310, 1311, 1312, and 1313, each offset at a different depth plane along optic axis 1390. Sections 1310, 1311, 1312, and 1313 are positioned in depth planes 1319, 1329, 1339, and 1349, respectively.

Each section of light shaping element 1301 includes multiple zones. For simplicity, section 1313 is depicted as having five zones, 1360–1364. Similarly, sections 1312, 1311, and 1310 have zones 1369–1373, 1379–1383, and 1389–1393, respectively. While light-shaping element 1301 is depicted as having 20 zones in total, the total number of zones is actually the same as the number of rows in the micro-mirror array of the SLM (e.g., 768 for a XGA SLM). Each zone is a transmission grating, with a grating period and orientation designed to scatter light from the SLM into a predetermined horizontal trajectory in a horizontal plane. Light-shaping element 1301 is designed so that each section can provide ray trajectories that span the same range in a horizontal plane.

Condensing lens 230 and cylindrical polygonal scanner 240 project each section of light shaping element 1301 to a different depth plane along optical axis 1390 in an image volume 1360. Sections 1310, 1311, 1312, and 1313 are projected to depth planes 1320, 1330, 1340, and 1350, respectively. During operation, cylindrical polygonal scanner 240 scans an image of light shaping element 1301 over image volume 1360. SLM 210 selectively directs illumination 205 from a light source to portions of light-shaping element 1301, which scatters the illumination into trajectories in the horizontal plane. Illumination scattered by each section of light-shaping element 1301 is projected to image volume 1360. The projected illumination appears to an appropriately positioned observer to originate from the different depth planes in image volume 1360. For example, light scattered by light-shaping element section 1313 is projected to depth plane 1350, the plane to which the observer's eyes are focused when viewing this scattered light.

Figure 14:
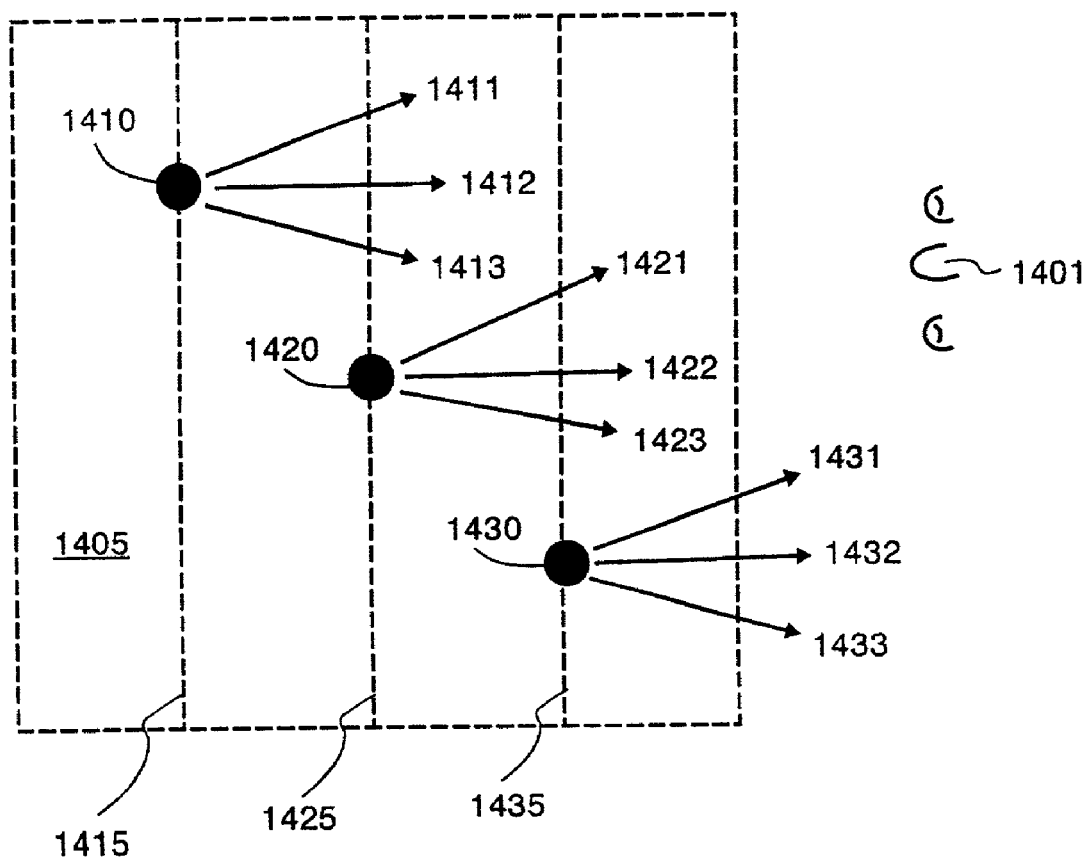
FIG. 14 is a schematic diagram of a horizontal slice through an image space of an embodiment of a volumetric horizontal-parallax-only display.

Display optics 1300 combines the properties of a HPO display and a volumetric display to generate a hybrid three-dimensional image. Each zone of the light-shaping element provides a light ray with a discrete trajectory, allowing the display to construct a stereoscopic image. Additionally, each zone of the light-shaping element also imparts depth information to the scattered light ray, so that stereoscopic image also fills a volume. Points at nearly any depth in the image volume can be rendered, typically by using the element whose imaged depth is closest to that point. Referring to FIG. 14, to elaborate on this, consider an exemplary image, including points 1410, 1420, and 1430 in a horizontal plane 1405, directed to an observer 1401. Each of points 1410, 1420, and 1430 are approximated by three diverging plane waves. Diverging plane wave trajectories are shown as rays 1411–1413, 1421–1423, and 1431–1433. Rays 1411, 1412, and 1413 diverge from point 1410 in depth plane 1415, rays 1421, 1422, and 1423 diverge from point 1420 in depth plane 1425, and rays 1431, 1432, and 1433 diverge from point 1430 in depth plane 1435.

The light-shaping element section that is scanned over the depth plane in which the point lies generates the three rays for each point. A different zone in the appropriate light shaping element section generates each ray of each point. The three-point three-dimensional image is thus generated in nine frames during a scan.

While hybrid light-shaping element 1301 has four sections, other embodiments are not so limited. A light-shaping element can be partitioned into as many sections as are needed, based on the general characteristics of the objects being imaged. The more sections a light-shaping element has, the more "volumetric" the display becomes, but at the cost of angular resolution for ray trajectories.

The light-shaping element does not necessarily need to be physically partitioned into a "stair-stepped" collection of sections. Given more sophisticated methods of forming the light-shaping element (e.g., using a two-step holographic exposure), only the image of the light-shaping element needs to be projected to different depth planes in the image volume. The light-shaping element itself can be a single, planar element, further simplifying the optical design of different display embodiments.

Figure 15A:
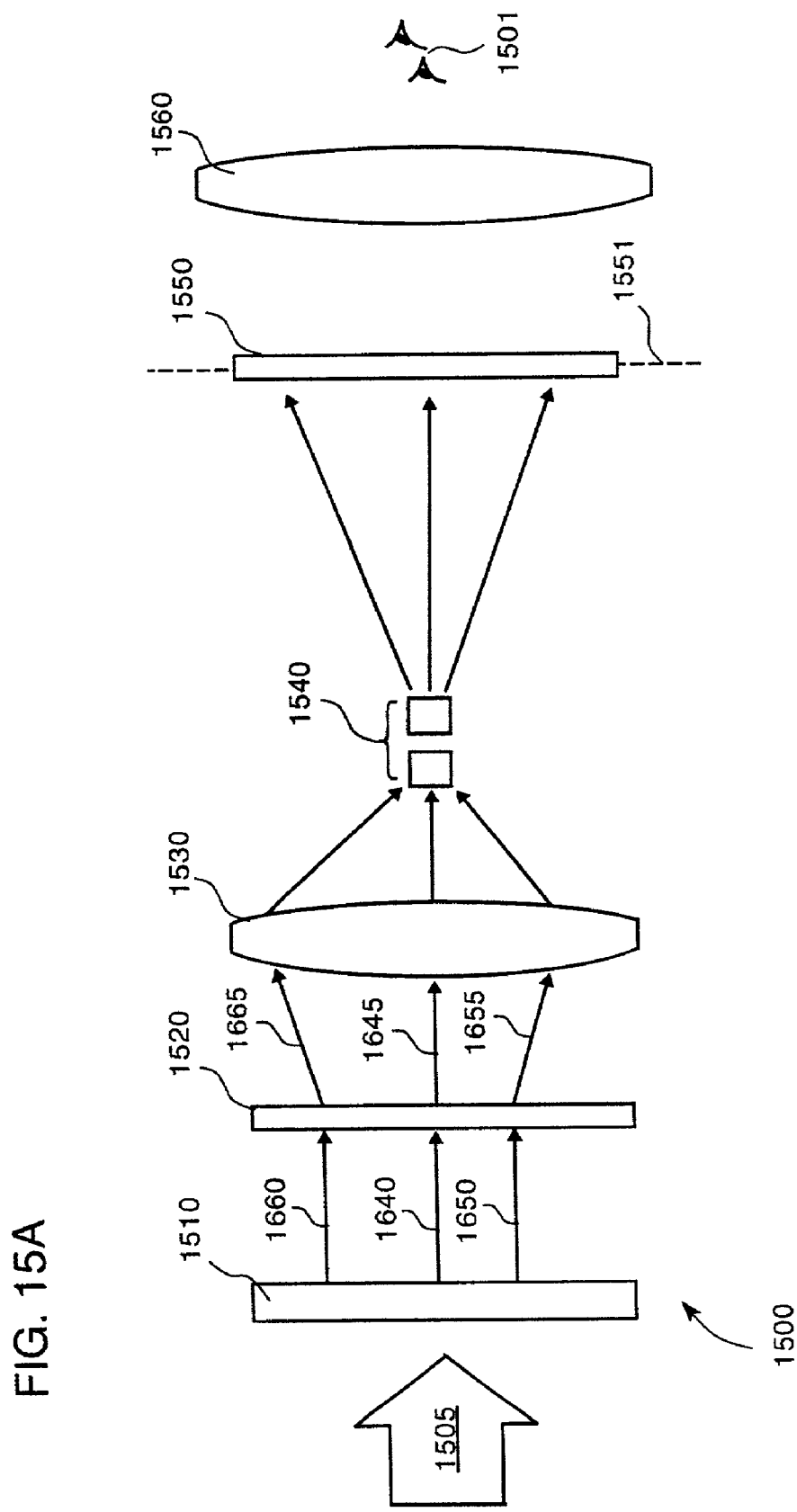
FIG. 15A is a schematic diagram of an embodiment of a full-parallax display.
Figure 15B:
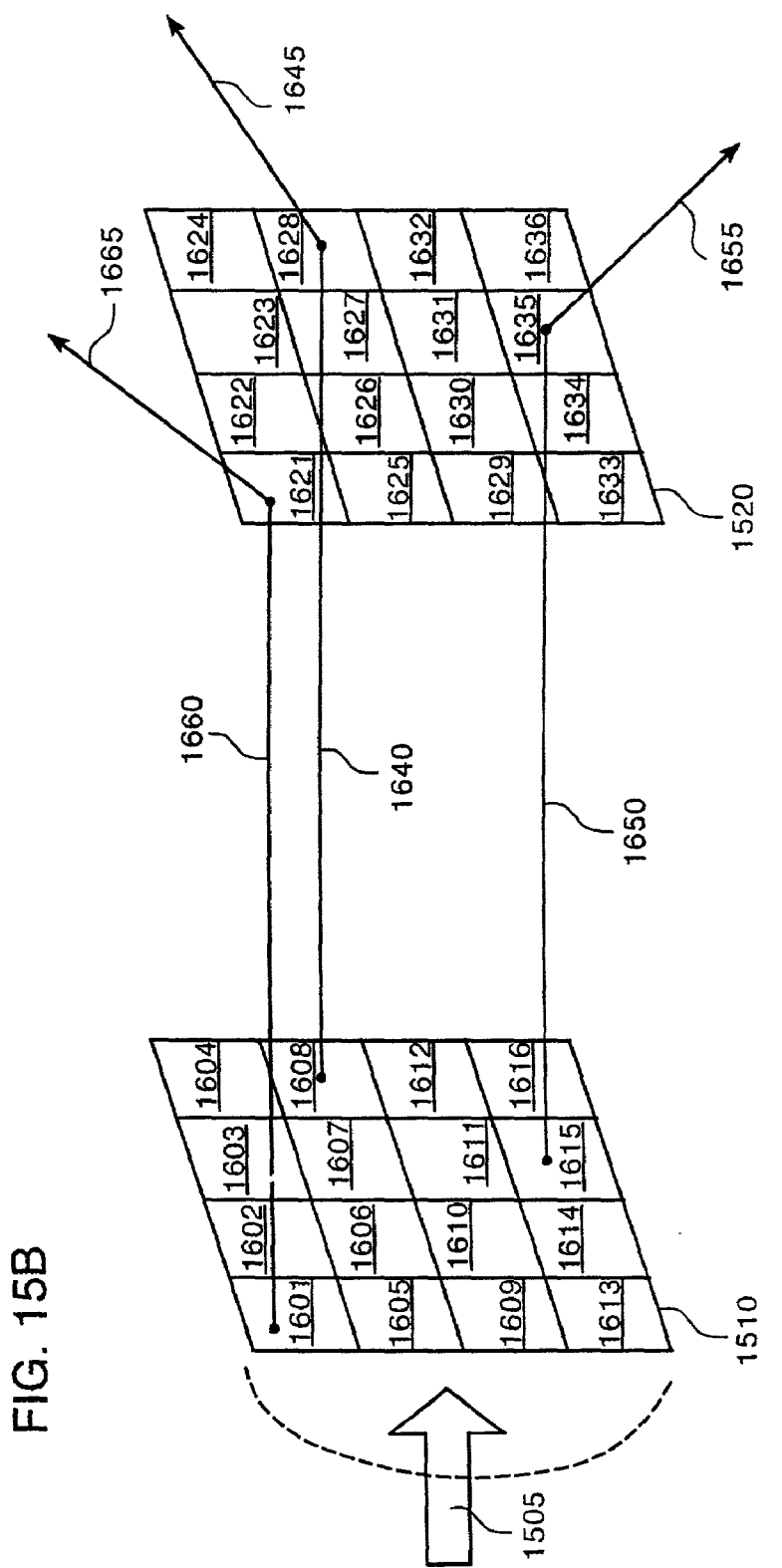
FIG. 15B is perspective view of an SLM and a light-shaping element in an embodiment of a full-parallax display.

The above-described principles of image generation can be adapted to provide full-parallax three-dimensional images. Referring to FIGS. 15A and 15B, display optics 1500 provides a full-parallax three-dimensional image to an observer 1501 position in a viewing zone. A full-parallax display allows observer 1501 to move within a horizontal and vertical range around the three-dimensional image, the movement in both directions affording the observer a different perception of the scene. This differs from the HPO display described above (see FIGS. 2 and 3), in which horizontal movement affords different perceptions of the scene, but vertical movement yields the perception that the image's vertical position is tracking the viewer.

Display optics 1501 includes a transmissive SLM 1510, a light-shaping element 1520, and an x-y scanning system 1540. SLM 1510 relays collimated illumination 1505 to dynamically chosen areas of light-shaping element 1520. Also included in display optics 1501 is a condensing lens 1530, which focuses light scattered by the light-shaping element onto x-y scanning system 1540 (e.g., a mirror mounted on a galvanometer, or a pair of cylindrical polygonal scanners). X-y scanning system 1540 projects the scattered light onto a screen 1550 positioned at an image plane 1551. Magnifying optics 1560 magnifies a three-dimensional image at image plane 1551 for an observer 1501 focused on the image plane.

SLM 1510 (e.g., a ferroelectric liquid crystal display) includes pixels 1601–1616, which act as independent dynamic light shutters to modulate the transmission of collimated illumination 1505 from a laser light source (not shown). Actually, SLM 1510 has many more pixels than the sixteen pixels shown in FIG. 15B for simplicity. Drive electronics switch pixels 1601–1616 between a transparent "on" state, and an opaque "off" state. As an illustrative example, three "on" pixels 1601, 1608, and 1615 are depicted in FIG. 15B, which transmit light rays 1660, 1640, and 1650 to light-shaping element 1520, respectively.

Light-shaping element 1520 is composed of tiled diffractive zones 1621–1636. Such devices are further described in U.S. patent application Ser. No. 09/648,313, which is incorporated herein by reference, in its entirety. Each light-shaping element zone corresponds to a pixel in SLM 1510. A light ray relayed through an "on" pixel is incident on the corresponding light-shaping element zone, where it is scattered into a trajectory determined by the orientation and grating period of the diffractive zone. For example, light-shaping element zones 1621, 1628, and 1635 scatter light rays 1660, 1640, and 1650 into trajectories 1665, 1645, and 1655, respectively.

Zones 1621–1636 provide trajectories having vertical and/or horizontal components. This distinguishes light shaping element 1520 from light shaping element 220 of HPO display 101 (see FIGS. 2 and 3). Light shaping element 220 provides trajectories having horizontal components only, and limits a stereoscopic image to having horizontal parallax only. By providing beam trajectories having both horizontal and vertical components, light shaping element 1520 enables display optics 1500 to create a fully three-dimensional light field, and hence a full parallax three-dimensional image. Light shaping element 1520 is a passive element, so the trajectories of beams in each frame of the three-dimensional image are ultimately determined by which SLM pixels are on for that frame.

X-y scanning system 1540 performs a raster scan of an image of light shaping element 1520 over screen 1550. SLM 1510 addresses the appropriate zones of light shaping element 1520 only in those timeslots in which x-y scanning system 1540 places the beams exiting light shaping element 1520 in the appropriate horizontal and vertical co-ordinates in image plane 1551 to create a desired three-dimensional image.

A three-dimensional image is generated in image plane 1551 as follows: a processor examines a three-dimensional dataset, and creates a list of zones on the light shaping element to illuminate, sorted by depth. The processor supplies this data to the SLM as a time-series of two-dimensional matrices (each corresponding to a time frame), which dictates when the appropriate zones of the light-shaping element should be illuminated in order to create the three-dimensional image.

Other full-parallax display embodiments are contemplated. For example, the light-shaping element in HPO display 100 (see FIGS. 2 and 3) can be replaced with an alternative full-parallax light-shaping element. The full-parallax light-shaping element has zones positioned identically to the zones of HPO light-shaping element 220, and the display also functions by vertically scanning an image of the light-shaping element over the image space. However, several of the zones in the full-parallax light-shaping element are configured to scatter illumination into vertical, instead of horizontal, trajectories. Of course, the trade off in acquiring vertical parallax is a reduction of the angular resolution of the display in the horizontal direction.

In general, in the embodiments described above, any light source can be used to provide light to the spatial light modulator. The light source can include any additional components (e.g., optical components) necessary to provide the SLM with collimated illumination incident at the appropriate angle for the SLM to direct toward the light-shaping element.

In some embodiments, the light source is a laser light source. For example, in displays utilizing a diffractive light-shaping element to provide plane wave trajectories, a coherent, monochromatic light source can be desirable in order to minimize the dispersive effects of the light-shaping element. Alternatively, the light source can be a broadband, incoherent light source. For example, when the SLM and light-shaping element exhibit minimal wavelength dependence (e.g., when the SLM is a micro-mirror array and the light shaping element is a tilted diffusing screen), a broadband light source can be used to provide a white image.

In some embodiments, the display provides a full-color image. For example, a broadband light source can be used to supply white light to an SLM, which includes an absorptive color filter array. The color filter array absorbs a spectral component from each ray directed toward the light-shaping element by the SLM. Each plane wave forming the image thus provides additional spectral information to the image. A full color three-dimensional image results from additive color mixing of the spectral components at the image plane. Another example is a display utilizing time sequential color addition to generate a full-color three-dimensional image. Each frame during a scan projected to the image space consists of three sub-frames, in which the SLM is illuminated with sequential red, green, and blue illumination. Each sub-frame generates a red, green, or blue component to the frame. Obviously, such a display requires an SLM with a response time sufficiently rapid to allow the SLM to be refreshed multiple times during each frame of the scan. An observer's visual system integrates the color-components together to yield a full-color image. An SLM with sub-frame refresh capabilities can also be dithered during a frame, to provide different levels of illumination to each plane wave constructing the image. This enables the display to generate images with grayscale.

In some embodiments, an array of light sources can function as both SLM and light source. For example, a pixelated organic light emitting diode (OLED) device can replace the light source and SLM. Additional passive optical component, such as a lenslet array, or micro-prism arrays, can be placed between the OLED device and the light-shaping element if necessary to collimate the light emitted by each OLED pixel.

Passive diffractive and diffusing light-shaping elements have been described. Generally, the light-shaping element can be any optical element or combination of optical elements that scatter incident illumination into the trajectories required to generate a three dimensional image. These can include diffractive, reflective, refractive and diffusing elements, and combinations of elements.

The systems of display optics described above can also include additional optical components for projecting the light-shaping element image to the image space. For example, the condensing lens can include any number of additional lenses or other optical components to focus light transmitted by the light-shaping element onto the scanner, projecting the light to the image space. Additional optics can also be included between the scanner and the image space. For example, a telecentric relay can image the light-shaping element to the image space. The relay can include the condensing lens plus additional lenses between the scanner and the image space. This system is particularly useful when using a light-shaping element that is tilted with respect to the optical axis.

A number of embodiments of the invention have been described. Nevertheless, it will be understood that various modifications may be made without departing from the spirit and scope of the invention. For example, a system can include redundant SLM pixels or light shaping element zones. In other words, multiple pixels and/or multiple zones can scatter incident illumination into trajectories or at the same depth plane. In such cases, it is not necessary to scan every zone over the entire image space, as the display can provide all components of the three-dimensional image to the image space in a partial scan. Accordingly, other embodiments are within the scope of the following claims.

What is claimed is:

1. A method for forming a three dimensional image by providing components of the image in a series of frames to an image space, the method comprising:
   scanning an image of a light shaping element over an image space wherein each of a plurality of zones of the light shaping element is projected to each of a plurality of zones of the image space; and
   selectively illuminating portions of the light shaping element zones during each of a plurality of frames during the scan, wherein each zone of the light-shaping element scatters the illumination and at least a portion of the scattered illumination provides a component of the three-dimensional image in the image space;
   wherein each zone of the light-shaping element scatters light into a predetermined trajectory.

2. The method of claim 1, wherein during the scanning every zone of the light-shaping element is projected to every zone of the image space.

3. The method of claim 1, wherein scanning the image of the light shaping element further comprises reflecting the scattered illumination off a scanning optic towards the image space.

4. The method of claim 1, further comprising scanning the image of the light-shaping element in a first direction over the image space.

5. The method of claim 4, wherein the first direction is a vertical direction.

6. The method of claim 4, further comprising scanning the image of the light-shaping element in a second direction over the image space.

7. The method of claim 6, wherein the first direction is a vertical direction and the second direction is a horizontal direction.

8. The method of claim 1, wherein each predetermined trajectory is parallel to a horizontal plane.

9. The method of claim 8, wherein the light-shaping element comprises a plurality of sections, and during the scanning each section is projected to a different depth plane in the image space.

10. A method for forming a three dimensional image by providing components of the image in a series of frames to an image space, the method comprising:
    scanning an image of a light shaping element over an image space wherein each of a plurality of zones of the light shaping element is projected to each of a plurality of zones of the image space; and
    selectively illuminating portions of the light shaping element zones during each of a plurality of frames during the scan, wherein each zone of the light-shaping element scatters the illumination and at least a portion of the scattered illumination provides a component of the three-dimensional image in the image space;
    wherein each zone of the light-shaping element diffusely scatters light.

11. The method of claim 10, wherein during the scanning each zone is projected to a different depth in the image space.

12. The method of claim 1, further comprising scattering the scattered illumination from the light-shaping element in a vertical direction at the image space to increase the vertical dimension of a viewing zone.

13. A three dimensional display system which forms a three-dimensional image by providing components of the image in a series of frames to an image space, the three-dimensional display comprising:
    a spatial light modulator;
    a light-shaping element, which comprises a plurality of zones;
    a scanning optic, which projects an image of the light-shaping element to an image space, wherein during operation the scanning optic scans the image of the light-shaping element over the image space, and in each of a plurality of frames during the scan, the spatial light modulator selectively illuminates portions of the light-shaping element zones, and each zone scatters the illumination, wherein at least a portion of the illumination scattered by the light-shaping element provides a component of the three-dimensional image in the image space.

14. The three-dimensional display system of claim 13, wherein the spatial light modulator comprises a plurality of rows and columns of elements, and each row of elements corresponds to a zone of the light-shaping element.

15. The three-dimensional display system of claim 13, wherein each element of the spatial light modulator corresponds to a zone of the light-shaping element.

16. The three-dimensional display system of claim 13, wherein each zone of the light-shaping element scatters illumination from the spatial light modulator into a predetermined trajectory.

17. The three-dimensional display system of claim 13, wherein each zone of the light-shaping element is a grating.

18. The three-dimensional display system of claim 13, wherein the light-shaping element comprises a plurality of light shaping element sections, each light-shaping element section comprising a plurality of zones, wherein each light-shaping element section is positioned in a different plane along an axis.

19. The three-dimensional display system of claim 13, wherein the light-shaping element diffusely scatters illumination from the spatial light modulator.

20. The three-dimensional display system of claim 19, wherein the light-shaping element comprises a diffusing screen, and the diffusing screen is placed at a non-perpendicular angle with respect to an optical axis.

21. The three-dimensional display system of claim 13, wherein each of at least two zones of the light-shaping element are projected to a different depth plane in the light-shaping element image.

22. The three-dimensional display system of claim 18, wherein the scanning optic comprises a cylindrical polygonal scanner, which reflects light from the light-shaping element towards the image space.

23. The three-dimensional display system of claim 13, further comprising a condensing lens, which focuses illumination from the light-shaping element onto the scanning optic.

24. The three-dimensional display system of claim 13, further comprising a telecentric relay, which relays the image of the light-shaping element to the image space.

25. The three-dimensional display system of claim 13, further comprising a vertically diffusing screen positioned in the image space.

* * * * *